United States Patent
Evans et al.

(10) Patent No.: US 10,633,929 B2
(45) Date of Patent: Apr. 28, 2020

(54) SELF-ADJUSTING EARTH-BORING TOOLS AND RELATED SYSTEMS

(71) Applicant: Baker Hughes, a GE company, LLC, Houston, TX (US)

(72) Inventors: Kenneth R. Evans, Spring, TX (US); Gregory L. Ricks, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 128 days.

(21) Appl. No.: 15/662,821

(22) Filed: Jul. 28, 2017

(65) Prior Publication Data
US 2019/0032416 A1    Jan. 31, 2019

(51) Int. Cl.
| | |
|---|---|
| B22F 3/00 | (2006.01) |
| B22F 3/105 | (2006.01) |
| B33Y 10/00 | (2015.01) |
| B33Y 80/00 | (2015.01) |
| E21B 10/32 | (2006.01) |
| E21B 10/60 | (2006.01) |

(Continued)

(52) U.S. Cl.
CPC .............. *E21B 10/60* (2013.01); *B22F 3/008* (2013.01); *B22F 3/1055* (2013.01); *B22F 5/10* (2013.01); *B33Y 10/00* (2014.12); *B33Y 80/00* (2014.12); *E21B 10/322* (2013.01); *E21B 10/62* (2013.01); *B22F 2005/001* (2013.01)

(58) Field of Classification Search
CPC ....... E21B 10/00; E21B 10/322; B33Y 10/00; B33Y 80/00
See application file for complete search history.

(56) References Cited

U.S. PATENT DOCUMENTS

| | | |
|---|---|---|
| 1,612,338 A | 12/1926 | Wilson et al. |
| 2,169,502 A | 8/1939 | Santiago |

(Continued)

FOREIGN PATENT DOCUMENTS

| | | |
|---|---|---|
| WO | 2005097383 A1 | 10/2005 |
| WO | 2009134842 | 11/2009 |

(Continued)

OTHER PUBLICATIONS

Jain, U.S. Appl. No. 14/516,069, Drill Bit with Self-Adjusting Gage Pads, filed Oct. 16, 2014.

(Continued)

*Primary Examiner* — Giovanna C Wight
*Assistant Examiner* — Brandon M Duck
(74) *Attorney, Agent, or Firm* — TraskBritt

(57) ABSTRACT

An earth-boring tool includes a movable component and an additive manufacturing formed flow control device in fluid communication with the movable component and configured to control a flowrate of the hydraulic fluid through the additive manufacturing formed flow control device, wherein the additive manufacturing formed flow control device is configured to control a movement of the movable component via the flowrate of hydraulic fluid through the additive manufacturing formed flow control device. An earth-boring tool includes an additive manufacturing formed flow control device in fluid communication with one or more components of the earth-boring tool and configured to provide a cooling fluid to the one or more components of the earth-boring tool.

23 Claims, 9 Drawing Sheets

(51) Int. Cl.
  *E21B 10/62* (2006.01)
  *B22F 5/10* (2006.01)
  *B22F 5/00* (2006.01)

(56) References Cited

U.S. PATENT DOCUMENTS

| | | | |
|---|---|---|---|
| 2,815,932 A | 12/1957 | Wolfram | |
| 3,050,122 A | 8/1962 | Huitt | |
| 3,422,672 A | 1/1969 | Payne | |
| 3,583,501 A | 6/1971 | Aalund | |
| 3,990,751 A * | 11/1976 | Murdoch | E21B 10/22 384/93 |
| 4,007,797 A | 2/1977 | Jeter | |
| 4,375,239 A | 3/1983 | Barrington et al. | |
| 4,386,669 A | 6/1983 | Evans | |
| 4,662,458 A | 5/1987 | Ho | |
| 4,856,601 A | 8/1989 | Raney | |
| 5,042,596 A | 8/1991 | Brett et al. | |
| 5,496,421 A * | 3/1996 | Hashizume | C22C 38/42 148/326 |
| 5,553,678 A | 9/1996 | Barr et al. | |
| 5,842,149 A | 11/1998 | Harrell et al. | |
| 5,967,247 A | 10/1999 | Pessier | |
| 6,021,377 A | 2/2000 | Dubinsky et al. | |
| 6,123,160 A | 9/2000 | Tibbitts | |
| 6,142,250 A | 11/2000 | Griffin et al. | |
| 6,157,893 A | 12/2000 | Berger et al. | |
| 6,173,797 B1 | 1/2001 | Dykstra et al. | |
| 6,209,664 B1 | 4/2001 | Amaudric Du Chaffaut | |
| 6,253,863 B1 | 7/2001 | Mensa-Wilmot et al. | |
| 6,338,390 B1 | 1/2002 | Tibbitts | |
| 6,349,780 B1 | 2/2002 | Beuershausen | |
| 6,484,822 B2 | 11/2002 | Watson et al. | |
| 6,484,825 B2 | 11/2002 | Watson et al. | |
| 6,732,817 B2 | 5/2004 | Dewey et al. | |
| 6,785,641 B1 | 8/2004 | Huang | |
| 6,880,650 B2 | 4/2005 | Hoffmaster et al. | |
| 6,971,459 B2 | 12/2005 | Raney | |
| 7,201,237 B2 | 4/2007 | Raney | |
| 7,240,744 B1 | 7/2007 | Kemick | |
| 7,314,099 B2 | 1/2008 | Dewey et al. | |
| 7,392,857 B1 | 7/2008 | Hall et al. | |
| 7,419,016 B2 | 9/2008 | Hall et al. | |
| 7,424,922 B2 | 9/2008 | Hall et al. | |
| 7,430,153 B2 | 9/2008 | Fraser et al. | |
| 7,451,836 B2 | 11/2008 | Hoffmaster et al. | |
| 7,451,837 B2 | 11/2008 | Hoffmaster et al. | |
| 7,493,971 B2 | 2/2009 | Nevlud et al. | |
| 7,523,792 B2 | 4/2009 | El-Rayes et al. | |
| 7,533,737 B2 | 5/2009 | Hall et al. | |
| 7,571,780 B2 | 8/2009 | Hall et al. | |
| 7,594,552 B2 | 9/2009 | Radford et al. | |
| 7,641,002 B2 | 1/2010 | Hall et al. | |
| 7,661,490 B2 | 2/2010 | Raney | |
| 7,721,823 B2 | 5/2010 | Radford | |
| 7,730,975 B2 | 6/2010 | Hall et al. | |
| 7,845,430 B2 | 12/2010 | Johnson et al. | |
| 7,849,939 B2 | 12/2010 | Downton et al. | |
| 7,866,413 B2 | 1/2011 | Stauffer et al. | |
| 7,882,905 B2 | 2/2011 | Radford et al. | |
| 7,921,937 B2 | 4/2011 | Brackin et al. | |
| 7,971,661 B2 | 7/2011 | Johnson et al. | |
| 7,971,662 B2 | 7/2011 | Beuershausen | |
| 8,061,455 B2 | 11/2011 | Beuershausen | |
| 8,087,479 B2 | 1/2012 | Kulkarni et al. | |
| 8,205,686 B2 | 6/2012 | Beuershausen | |
| 8,205,689 B2 | 6/2012 | Radford | |
| 8,240,399 B2 | 8/2012 | Kulkarni et al. | |
| 8,281,882 B2 | 10/2012 | Hall et al. | |
| 8,302,703 B2 | 11/2012 | Rolovic | |
| 8,443,875 B2 | 5/2013 | Lee | |
| 8,453,763 B2 | 6/2013 | Radford et al. | |
| 8,511,946 B2 | 8/2013 | Woodruff et al. | |
| 8,534,384 B2 | 9/2013 | Beuershausen et al. | |
| 8,739,884 B2 | 6/2014 | Lake | |
| 8,746,368 B2 | 6/2014 | Johnson et al. | |
| 8,763,726 B2 | 7/2014 | Johnson et al. | |
| 8,768,726 B1 | 7/2014 | Cave | |
| 8,813,871 B2 | 8/2014 | Radford et al. | |
| 8,925,654 B2 | 1/2015 | Zahradnik | |
| 8,950,517 B2 | 2/2015 | Hall et al. | |
| 8,960,329 B2 | 2/2015 | Downton | |
| 9,080,399 B2 | 7/2015 | Oesterberg | |
| 9,103,175 B2 | 8/2015 | Schwefe | |
| 9,140,074 B2 | 9/2015 | Schwefe et al. | |
| 9,181,756 B2 | 11/2015 | Schwefe et al. | |
| 9,187,960 B2 | 11/2015 | Radford et al. | |
| 9,255,449 B2 | 2/2016 | Schwefe et al. | |
| 9,255,450 B2 | 2/2016 | Jain et al. | |
| 9,267,329 B2 | 2/2016 | Bilen | |
| 9,279,293 B2 | 3/2016 | Izbinski | |
| 9,359,826 B2 | 6/2016 | Do et al. | |
| 9,399,892 B2 | 7/2016 | Do et al. | |
| 9,611,697 B2 | 4/2017 | Radford et al. | |
| 9,663,995 B2 | 5/2017 | Jain | |
| 9,677,344 B2 | 6/2017 | Radford et al. | |
| 9,708,859 B2 | 7/2017 | Jain et al. | |
| 9,759,014 B2 | 9/2017 | Do et al. | |
| 9,915,138 B2 | 3/2018 | Schwefe et al. | |
| 9,932,780 B2 | 4/2018 | Spencer et al. | |
| 9,970,239 B2 | 5/2018 | Oesterberg | |
| 10,000,977 B2 | 6/2018 | Jain et al. | |
| 10,001,005 B2 | 6/2018 | Schwefe et al. | |
| 10,041,305 B2 | 8/2018 | Jain | |
| 2001/0040055 A1 * | 11/2001 | Olsson | E21B 10/18 175/340 |
| 2003/0016640 A1 | 1/2003 | Onggosanusi et al. | |
| 2003/0146305 A1 | 8/2003 | Gurich et al. | |
| 2003/0166470 A1 | 9/2003 | Fripp et al. | |
| 2004/0040747 A1 * | 3/2004 | Neville | E21B 10/25 175/57 |
| 2005/0096847 A1 | 5/2005 | Huang | |
| 2007/0079991 A1 | 4/2007 | Cooley et al. | |
| 2007/0114065 A1 | 5/2007 | Hall | |
| 2007/0221408 A1 | 9/2007 | Hall et al. | |
| 2007/0221416 A1 | 9/2007 | Hall et al. | |
| 2007/0272445 A1 | 11/2007 | Cariveau et al. | |
| 2008/0000693 A1 | 1/2008 | Hutton | |
| 2008/0017419 A1 | 1/2008 | Cooley et al. | |
| 2008/0041593 A1 | 2/2008 | Brown et al. | |
| 2009/0044979 A1 | 2/2009 | Johnson et al. | |
| 2009/0097985 A1 | 4/2009 | Lea-Wilson | |
| 2009/0107722 A1 | 4/2009 | Chen et al. | |
| 2009/0133931 A1 | 5/2009 | Rolovic | |
| 2009/0183790 A1 | 7/2009 | Moore | |
| 2010/0025116 A1 | 2/2010 | Hutton | |
| 2010/0038141 A1 | 2/2010 | Johnson et al. | |
| 2010/0065334 A1 | 3/2010 | Hall et al. | |
| 2010/0071956 A1 | 3/2010 | Beuershausen | |
| 2010/0157735 A1 | 6/2010 | Allan et al. | |
| 2010/0212964 A1 | 8/2010 | Beuershausen | |
| 2010/0270085 A1 | 10/2010 | Turner et al. | |
| 2011/0155473 A1 | 6/2011 | Raney | |
| 2012/0106297 A1 | 5/2012 | Fraser | |
| 2012/0255788 A1 | 10/2012 | Schwefe et al. | |
| 2012/0318580 A1 | 12/2012 | Oesterberg | |
| 2013/0025358 A1 | 1/2013 | Radford et al. | |
| 2013/0081880 A1 | 4/2013 | Schwefe et al. | |
| 2013/0180784 A1 | 7/2013 | Esko et al. | |
| 2013/0213667 A1 | 8/2013 | Lopez et al. | |
| 2014/0311801 A1 | 10/2014 | Jain et al. | |
| 2014/0332271 A1 | 11/2014 | Do et al. | |
| 2014/0332283 A1 | 11/2014 | Do et al. | |
| 2014/0356419 A1 | 12/2014 | Gujral et al. | |
| 2015/0191979 A1 | 7/2015 | Jain et al. | |
| 2016/0032658 A1 | 2/2016 | Jain | |
| 2016/0053551 A1 | 2/2016 | Jain et al. | |
| 2016/0123355 A1 | 5/2016 | Collins | |
| 2016/0138353 A1 | 5/2016 | Ruttley et al. | |
| 2016/0145982 A1 * | 5/2016 | Otta | E21B 43/123 137/155 |
| 2016/0258224 A1 | 9/2016 | Do et al. | |
| 2017/0037685 A1 * | 2/2017 | Strachan | E21B 7/067 |
| 2017/0074047 A1 | 3/2017 | Jain | |

(56) References Cited

U.S. PATENT DOCUMENTS

| | | | |
|---|---|---|---|
| 2017/0159370 A1 | 6/2017 | Evans et al. | |
| 2017/0175454 A1 | 6/2017 | Ricks et al. | |
| 2017/0175455 A1 | 6/2017 | Jain et al. | |
| 2017/0234071 A1 | 8/2017 | Spatz et al. | |
| 2017/0268312 A1 | 9/2017 | Haake | |
| 2017/0335631 A1 | 11/2017 | Eddison | |
| 2017/0362898 A1 | 12/2017 | Do et al. | |
| 2018/0128060 A1 | 5/2018 | Haugvaldstad | |
| 2018/0179826 A9 | 6/2018 | Jain et al. | |
| 2019/0234151 A1* | 8/2019 | Olsen | B22F 7/08 |

FOREIGN PATENT DOCUMENTS

| | | |
|---|---|---|
| WO | 2013/160188 A1 | 10/2013 |
| WO | 2016/187372 A1 | 11/2016 |
| WO | 2017044763 A1 | 3/2017 |
| WO | 2017/106605 A1 | 6/2017 |
| WO | 2017/132033 A1 | 8/2017 |
| WO | 2017/142815 A1 | 8/2017 |

OTHER PUBLICATIONS

Jain, U.S. Appl. No. 14/851,117 entitled Actively Controlled Self-Adjusting Bits and Related Systems and Methods, filed Sep. 11, 2015.
Jain et al., U.S. Appl. No. 14/516,203, Modeling and Simulation of Drill Strings with Adaptive Systems, dated Oct. 16, 2014.
Jain et al., U.S. Appl. No. 14/973,282, Earth-Boring Tools Including Passively Adjustable, Agressiveness-Modifying Members and Related Methods, filed Dec. 17, 2015.
Jain et al., Mitigation of Torsional Stick-Slip Vibrations in Oil Well Drilling Through PCD Bit Design: Putting Theories to the Test, SPE 146561, Soiciet of Petroleum Engineers, 2011, pp. 1-13.
Ricks et al., U.S. Appl. No. 14/972,635 entitiled Self-Adjusting Earth-Boring Tools and Related Systems and Methods filed Dec. 17, 2015.
International Written Opinion for International Application No. PCT/US2018/043746 dated Oct. 31, 2018, 8 pages.
International Written Opinion for International Application No. PCT/US2016/067106 dated May 19, 2017, 8 pages.
International Written Opinion for International Application No. PCT/US2016/066656 mailed Mar. 28, 2017, 13 pages.
International Search Report for International Application No. PCT/US2018/043746 dated Oct. 31, 2018, 3 pages.
Anonymous: "Restriction Orifice (RO)—Flow Control Instrument", Oct. 9, 2014 (Oct. 9, 2014), XP055524550, Retrieved from the Internet: URL:https://web.archive.org/web/20141009000142/http://www.piping-engineering.com/restriction-orifice-ro-flow-controlinstrument.html [retrieved on Nov. 16, 2018].
European Communication pursuant to Article 94(3) EPC for European Application No. 15850810.1, dated Nov. 30, 2018, 6 pages.
European search Report and Opinion for European Application No. 15850810.1, dated May 4, 2018, 9 pages.

\* cited by examiner

SELF-ADJUSTING EARTH-BORING TOOLS AND RELATED SYSTEMS

CROSS-REFERENCE TO RELATED APPLICATIONS

This application is related to U.S. patent application Ser. No. 13/864,926, to Jain et al., filed Apr. 17, 2013, now U.S. Pat. No. 9,255,450, issued Feb. 9, 2016. This application is also related to U.S. patent application Ser. No. 14/972,635 to Ricks et al., filed Dec. 17, 2015, U.S. patent application Ser. No. 14/973,282, to Jain et al., filed Dec. 17, 2015 and U.S. patent application Ser. No. 14/851,117, to Jain, filed Sep. 11, 2015. The disclosure of each of the foregoing applications is hereby incorporated by reference in its entirety.

TECHNICAL FIELD

This disclosure relates generally to flow restrictors for use in self-adjusting earth-boring tools for use in drilling wellbores and to self-adjusting earth-boring tools so equipped.

BACKGROUND

Oil wells (wellbores) are usually drilled with a drill string. The drill string includes a tubular member having a drilling assembly that includes a single drill bit at its bottom end. The drilling assembly typically includes devices and sensors that provide information relating to a variety of parameters relating to the drilling operations ("drilling parameters"), behavior of the drilling assembly ("drilling assembly parameters") and parameters relating to the formations penetrated by the wellbore ("formation parameters"). A drill bit and/or reamer attached to the bottom end of the drilling assembly is rotated by rotating the drill string from the drilling rig and/or by a drilling motor (also referred to as a "mud motor") in the bottom-hole assembly ("BHA") to remove formation material to drill the wellbore. A large number of wellbores are drilled along non-vertical, contoured trajectories in what is often referred to as directional drilling. For example, a single wellbore may include one or more vertical sections, deviated sections and horizontal sections extending through differing types of rock formations.

When drilling with a fixed-cutter, or so-called "drag" bit or other earth-boring tool that progresses from a soft formation, such as sand, to a hard formation, such as shale, or vice versa, the rate of penetration ("ROP") changes, and excessive ROP fluctuations and/or vibrations (lateral or torsional) may be generated in the drill bit. The ROP is typically controlled by controlling the weight-on-bit ("WOB") and rotational speed (revolutions per minute or "RPM") of the drill bit. WOB is controlled by controlling the hook load at the surface and RPM is controlled by controlling the drill string rotation at the surface and/or by controlling the drilling motor speed in the drilling assembly. Controlling the drill bit vibrations and ROP by such methods requires the drilling system or operator to take actions at the surface. The impact of such surface actions on the drill bit fluctuations is not substantially immediate. Drill bit aggressiveness contributes to the vibration, whirl and stick-slip for a given WOB and drill bit rotational speed. "Depth of Cut" ("DOC") of a fixed-cutter drill bit, is generally defined as a distance a cutter affixed to a bit penetrates a formation being drilled, and may also be characterized by a longitudinal distance a bit advances into a formation being drilled over a revolution of the bit, both parameters being indicative of the drill bit's aggressiveness. Controlling DOC can prevent excessive formation material buildup on the bit (e.g., "bit balling,"), limit reactive torque to an acceptable level and avoid loss of tool face and stick/slip of the drill string, enhance steerability and directional control of the bit, provide a smoother and more consistent diameter borehole, avoid premature damage to the cutting elements, and prolong operating life of the drill bit.

BRIEF SUMMARY

One or more embodiments of the present disclosure include earth-boring tools including a movable component and an additive manufacturing formed flow control device in fluid communication with the movable component and configured to control a flowrate of the hydraulic fluid through the additive manufacturing formed flow control device, wherein the additive manufacturing formed flow control device is configured to control a movement of the movable component via the flowrate of hydraulic fluid through the additive manufacturing formed flow control device.

Additional embodiments of the present disclosure include earth-boring tools including an additive manufacturing formed flow control device in fluid communication with one or more components of the earth-boring tool and configured to provide a cooling fluid to the one or more components of the earth-boring tool.

Some embodiments of the present disclosure include earth-boring tools that include a body, an actuation device disposed at least partially within the body, and a drilling element. The actuation device may include a first fluid chamber, a second fluid chamber, at least one reciprocating member configured to reciprocate back and forth within the first fluid chamber and the second fluid chamber, a hydraulic fluid disposed within and at least substantially filling the first fluid chamber and the second fluid chamber, a first fluid flow path extending from the second fluid chamber to the first fluid chamber, and a first additive manufacturing formed flow control device disposed within the first fluid flow path and configured to control a flowrate of the hydraulic fluid through the first fluid flow path. The drilling element may be removably coupled to the reciprocating member of the actuation device.

Further embodiments of the present disclosure include earth-boring tools including a body, an actuation device disposed at least partially within the body, and a drilling element assembly. The actuation device may include a first fluid chamber, a second fluid chamber, at least one reciprocating member configured to reciprocate back and forth within the first fluid chamber and the second fluid chamber, a first additive manufacturing formed flow control device disposed within a first fluid flow path extending between the first fluid chamber and the second fluid chamber, the first additive manufacturing formed flow control device being configured to control a flowrate of a hydraulic fluid through the first fluid flow path, a second additive manufacturing formed flow control device disposed within a second fluid flow path extending between the first fluid chamber and the second fluid chamber, the second additive manufacturing formed flow control device being configured to control a flowrate of the hydraulic fluid through the second fluid flow path, and a connection member attached to the at least one reciprocating member and extending out of the second fluid chamber. The drilling element assembly may be removably coupled to a longitudinal end of the connection member extending out of the second fluid chamber.

Additional embodiments of the present disclosure include actuation devices for a self-adjusting earth-boring tool. The actuation device may include a first fluid chamber and a second fluid chamber, an additive manufacturing formed reciprocating member configured to reciprocate back and forth within the first fluid chamber and the second fluid chamber and having a first additive manufacturing formed flow control device disposed therein, wherein the first additive manufacturing formed flow control device extends between the first fluid chamber and the second fluid chamber, the first additive manufacturing formed flow control device being configured to control a flowrate of a hydraulic fluid between the first fluid chamber and the second fluid chamber, and a drilling element attached to the connection member.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
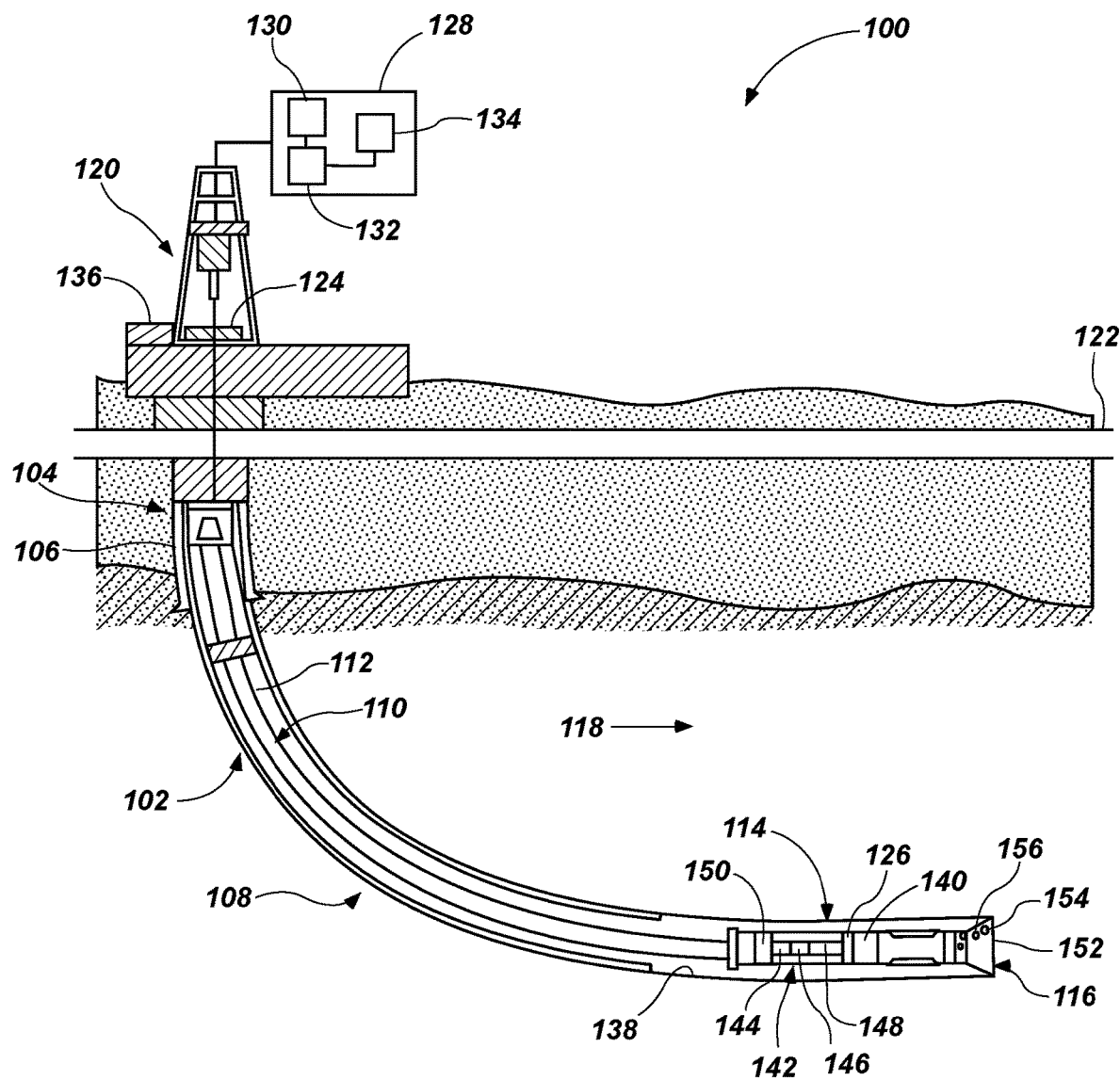
FIG. 1 is a schematic diagram of a wellbore system comprising a drill string that includes a self-adjusting drill bit according to an embodiment of the present disclosure.

The illustrations presented herein are not actual views of any particular drilling system, drilling tool assembly, or component of such an assembly, but are merely idealized representations, which are employed to describe the present invention.

As used herein, the terms "bit" and "earth-boring tool" each mean and include earth-boring tools for forming, enlarging, or forming and enlarging a wellbore. Non-limiting examples of bits include fixed-cutter (drag) bits, fixed-cutter coring bits, fixed-cutter eccentric bits, fixed-cutter bicenter bits, fixed-cutter reamers, expandable reamers with blades bearing fixed cutters, and hybrid bits including both fixed cutters and movable cutting structures (roller cones).

As used herein, the term "fixed cutter" means and includes a cutting element configured for a shearing cutting action, abrasive cutting action or impact (percussion) cutting action and fixed with respect to rotational movement in a structure bearing the cutting element, such as, for example, a bit body, a tool body, or a reamer blade, without limitation.

As used herein, the terms "wear element" and "bearing element" respectively mean and include elements mounted to an earth-boring tool and which are not configured to substantially cut or otherwise remove formation material when contacting a subterranean formation in which a wellbore is being drilled or enlarged.

As used herein, the term "drilling element" means and includes fixed cutters, wear elements, and bearing elements. For example, drilling elements may include cutting elements, pads, elements making rolling contact, elements that reduce friction with formations, polycrystalline diamond compact (PDC) bit blades, cones, elements for altering junk slot geometry, etc.

As used herein, any relational term, such as "first," "second," "front," "back," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Some embodiments of the present disclosure include self-adjusting drill bits for use in a wellbore. For example, a self-adjusting drill bit may include an actuation device for extending and retracting a drilling element (e.g., a cutting element or a bearing element) of the bit. The drilling element may be attached to a connection member, which is attached to at least two reciprocating members within the actuation device. The reciprocating members may extend and retract the drilling element by moving through inward and outward strokes. The actuation device may include a first fluid chamber and a second fluid chamber. Furthermore, the actuation device may include at least one flow control device that controls flowrates of hydraulic fluid between the first and second fluid chambers, and, as a result, movement of the reciprocating members. Moreover, by controlling the flowrates of the hydraulic fluid between the first and second fluid chambers, the at least one flow control device may at least partially control rates at which the drilling element extends and retracts.

In some embodiments, the actuation device includes one or more flow control devices formed using an additive manufacturing process. Forming the flow control devices via additive manufacturing processes may enable flowrates of the hydraulic fluid through a flow control device to be optimized and/or selected to provide selected rates at which the drilling element extends and retracts. In particular, forming the flow control devices via additive manufacturing processes may allow surface areas of flow passages through the flow control devices to be maximized in order to maximize restriction and/or selected in order to provide a selected amount of restriction. Moreover, forming the flow control devices via additive manufacturing processes may allow lengths of flow passages through the flow control devices to be maximized in comparison to those manufactured by conventional manufacturing techniques, in order to maximize flow restriction and/or selected in order to provide a selected amount of flow restriction. Furthermore, flow control devices of the present disclosure may require less material to form and may result in cost savings in forming the actuation device. In addition, flow control devices of the present disclosure may include flow passages of configurations, cross-sectional shapes, and variable cross-sectional areas not achievable with conventional manufacturing techniques.

FIG. 1 is a schematic diagram of an example of a drilling system 100 that may utilize the apparatuses and methods disclosed herein for drilling wellbores. FIG. 1 shows a wellbore 102 that includes an upper section 104 with a casing 106 installed therein and a lower section 108 that is being drilled with a drill string 110. The drill string 110 may include a tubular member 112 that carries a drilling assembly 114 at its bottom end. The tubular member 112 may be made up by joining drill pipe sections or it may be a string of coiled tubing. A drill bit 116 may be attached to the bottom end of the drilling assembly 114 for drilling the wellbore 102 of a selected diameter in a formation 118.

The drill string 110 may extend to a rig 120 at the surface 122. The rig 120 shown is a land rig 120 for ease of explanation. However, the apparatuses and methods disclosed equally apply when an offshore rig 120 is used for drilling wellbores under water. A rotary table 124 or a top drive may be coupled to the drill string 110 and may be utilized to rotate the drill string 110 and to rotate the drilling assembly 114, and thus the drill bit 116 to drill the wellbore 102. A drilling motor 126 (also referred to as "mud motor") may be provided in the drilling assembly 114 to rotate the drill bit 116. The drilling motor 126 may be used alone to rotate the drill bit 116 or to superimpose the rotation of the drill bit 116 by the drill string 110. The rig 120 may also include conventional equipment, such as a mechanism to add additional sections to the tubular member 112 as the wellbore 102 is drilled. A surface control unit 128, which may be a computer-based unit, may be placed at the surface 122 for receiving and processing downhole data transmitted by sensors 140 in the drill bit 116 and sensors 140 in the drilling assembly 114, and for controlling selected operations of the various devices and sensors 140 in the drilling assembly 114. The sensors 140 may include one or more of sensors 140 that determine acceleration, weight on bit, torque, pressure, cutting element positions, rate of penetration, inclination, azimuth formation/lithology, etc. In some embodiments, the surface control unit 128 may include a processor 130 and a data storage device 132 (or a computer-readable medium) for storing data, algorithms, and computer programs 134. The data storage device 132 may be any suitable device, including, but not limited to, a read-only memory (ROM), a random-access memory (RAM), a Flash memory, a magnetic tape, a hard disk, and an optical disk. During drilling, a drilling fluid from a source 136 thereof may be pumped under pressure through the tubular member 112, which discharges at the bottom of the drill bit 116 and returns to the surface 122 via an annular space (also referred as the "annulus") between the drill string 110 and an inside wall 138 of the wellbore 102.

The drilling assembly 114 may further include one or more downhole sensors 140 (collectively designated by numeral 140). The sensors 140 may include any number and type of sensors 140, including, but not limited to, sensors 140 generally known as the measurement-while-drilling (MWD) sensors 140 or the logging-while-drilling (LWD) sensors 140, and sensors 140 that provide information relating to the behavior of the drilling assembly 114, such as drill bit rotation (revolutions per minute or "RPM"), tool face, pressure, vibration, whirl, bending, and stick-slip. The drilling assembly 114 may further include a controller unit 142 that controls the operation of one or more devices and sensors 140 in the drilling assembly 114. For example, the controller unit 142 may be disposed within the drill bit 116 (e.g., within a shank and/or crown of a bit body of the drill bit 116). The controller unit 142 may include, among other things, circuits to process the signals from sensor 140, a processor 144 (such as a microprocessor) to process the digitized signals, a data storage device 146 (such as a solid-state-memory), and a computer program 148. The processor 144 may process the digitized signals, and control downhole devices and sensors 140, and communicate data information with the surface control unit 128 via a two-way telemetry unit 150.

The drill bit 116 may include a face section 152 (or bottom section). The face section 152 or a portion thereof may face the undrilled formation 118 in front of the drill bit 116 at the wellbore 102 bottom during drilling. In some embodiments, the drill bit 116 may include one or more cutting elements that may be extended and retracted from a surface, such as a surface over the face section 152, of the drill bit 116 and, more specifically, a blade projecting from the face section 152. An actuation device 156 may control the rate of extension and retraction of a drilling element 154 with respect to the drill bit 116. In some embodiments, the actuation device 156 may be a passive device that automatically adjusts or self-adjusts the rate of extension and retraction of the drilling element 154 based on or in response to a force or pressure applied to the drilling element 154 during drilling. In some embodiments, the actuation device 156 and drilling element 154 may be actuated by contact of the drilling element 154 with the formation 118. In some drilling operations, substantial forces may be experienced on the drilling elements 154 when a depth of cut ("DOC") of the drill bit 116 is changed rapidly while the drilling element 154 is engaged with the formation 118. Accordingly, the actuation device 156 may be configured to resist sudden changes to the DOC of the drill bit 116. For example, in some embodiments, the rates of extension and retraction of the drilling element 154 may be at least partially controlled via a flowrate of a fluid through one or more flow control devices. Embodiments of flow control devices are described in greater detail below in regard to FIGS. 3-9.

Figure 2:
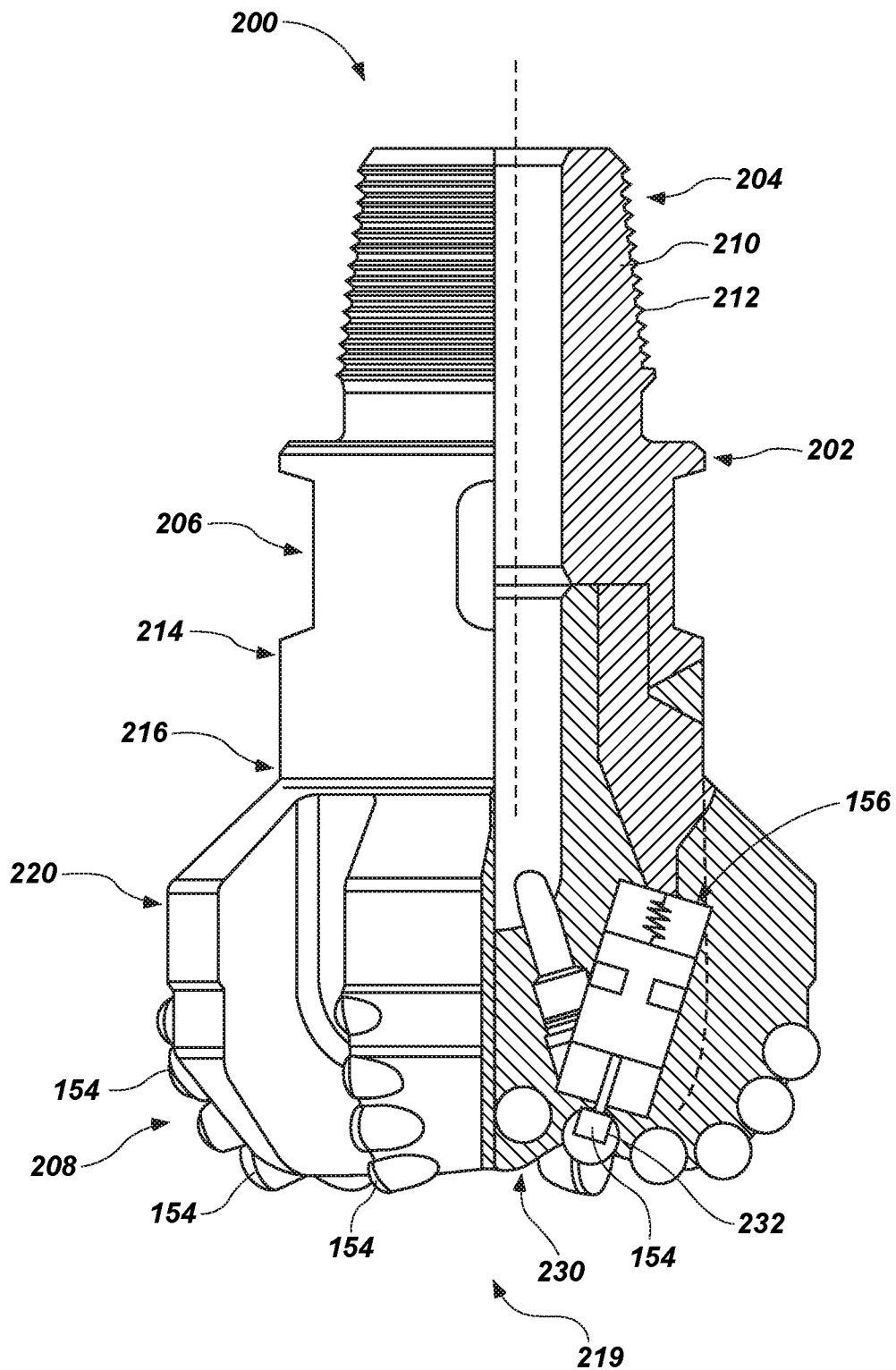
FIG. 2 is a partial cross-sectional view of a self-adjusting drill bit having three-dimensional (3D) printed flow control device according to an embodiment of the present disclosure.

FIG. 2 shows an earth-boring tool 200 having an actuation device 156 that may utilize one or more flow control devices of the present disclosure. In some embodiments, the earth-boring tool 200 includes a fixed-cutter polycrystalline diamond compact (PDC) bit having a bit body 202 that includes a neck 204, a shank 206, and a crown 208. The earth-boring tool 200 may be any suitable drill bit or earth-boring tool for use in drilling and/or enlarging a wellbore in a formation.

The neck 204 of the bit body 202 may have a tapered upper end 210 having threads 212 thereon for connecting the earth-boring tool 200 to a box end of the drilling assembly 114 (FIG. 1). The shank 206 may include a lower straight section 214 that is fixedly connected to the crown 208 at a joint 216. The crown 208 may include a number of blades 220. Each blade 220 may have multiple regions as known in the art (cone, nose, shoulder, gage).

The earth-boring tool 200 may include one or more cutting, wear, or bearing elements 154 (referred to hereinafter as "drilling elements 154") that extend and retract from a surface 230 of the earth-boring tool 200. For example, the bit body 202 of the earth-boring tool 200 may carry (e.g., have attached thereto) a plurality of drilling elements 154. As shown in FIG. 2, the drilling element 154 may be movably disposed in a cavity or recess 232 in the crown 208. An actuation device 156 may be coupled to the drilling element 154 and may be configured to control rates at which the drilling element 154 extends and retracts from the earth-boring tool 200 relative to a surface 230 of the earth-boring tool 200. In one or more embodiments, the actuation device 156 may at least partially control the rates at which the drilling element 154 extends and retracts from the earth-boring tool 200 via flowrates of a hydraulic fluid through one or more flow control devices. In some embodiments, the actuation device 156 may be disposed inside the blades 220 supported by the bit body 202 and may be secured to the bit body 202 with a press fit proximate a face 219 of the earth-boring tool 200.

In further embodiments, the actuation device 156 may be disposed within a gage region of a bit body 202. For example, the actuation device 156 may be coupled to a gage pad and may be configured to control rates at which the gage pad extends and retracts from the gage region of the bit body 202. Furthermore, as noted above, in some embodiments, the actuation device 156 may at least partially control rates at which the gage pad extends and retracts from the gage region via flowrates of a fluid through one or more flow control devices. In some instances, the actuation device 156 may be disposed within a gage region similar to the actuation devices described in U.S. patent application Ser. No. 14/516,069, to Jain, now U.S. Pat. No. 9,663,995, issued May 30, 2017, the disclosure of which is incorporated in its entirety herein by this reference.

Figure 3:
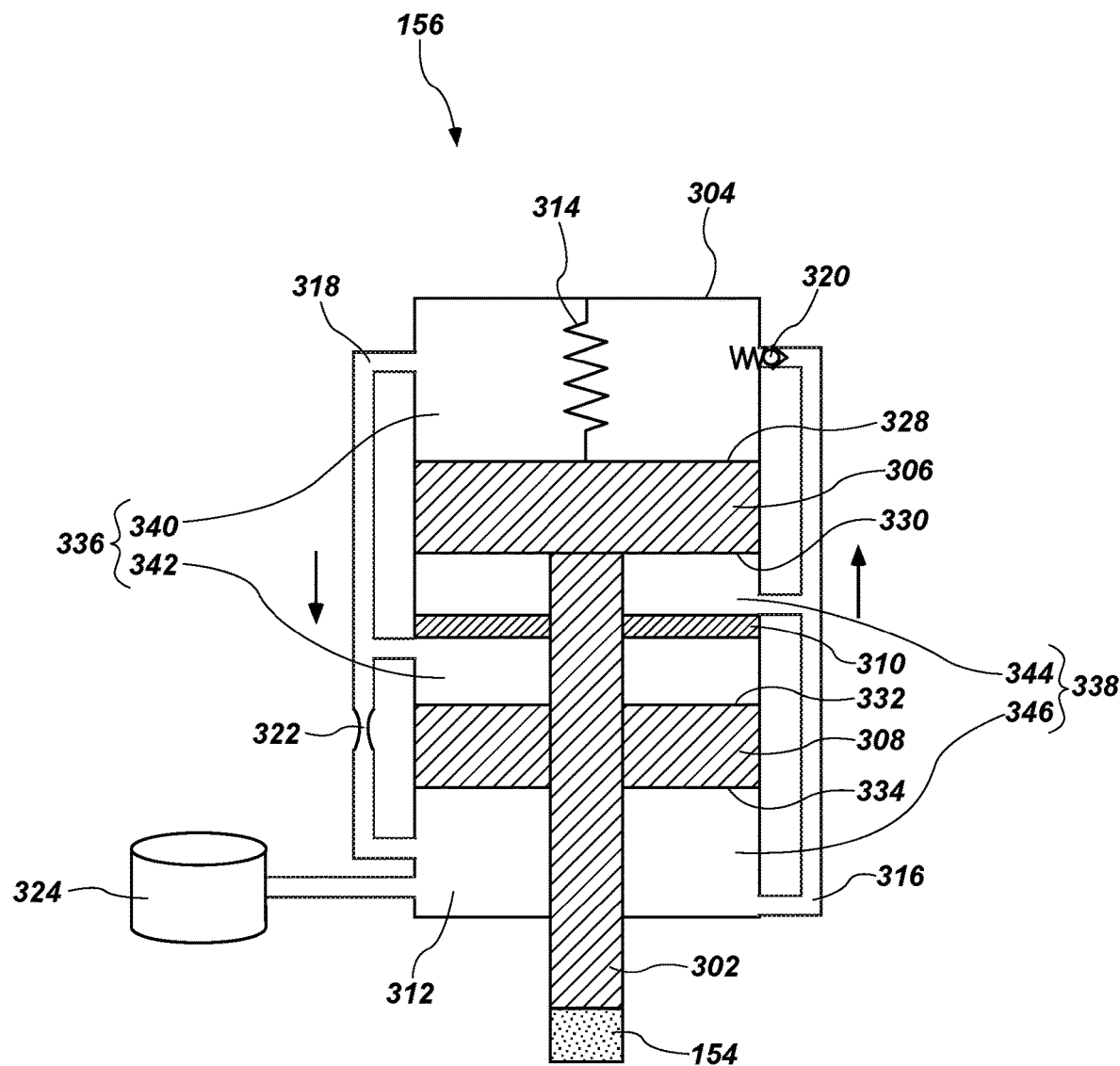
FIG. 3 is a schematic representation of an actuation device of a self-adjusting drill bit having a 3D printed flow control device according to an embodiment of the present disclosure.
Figure 4:
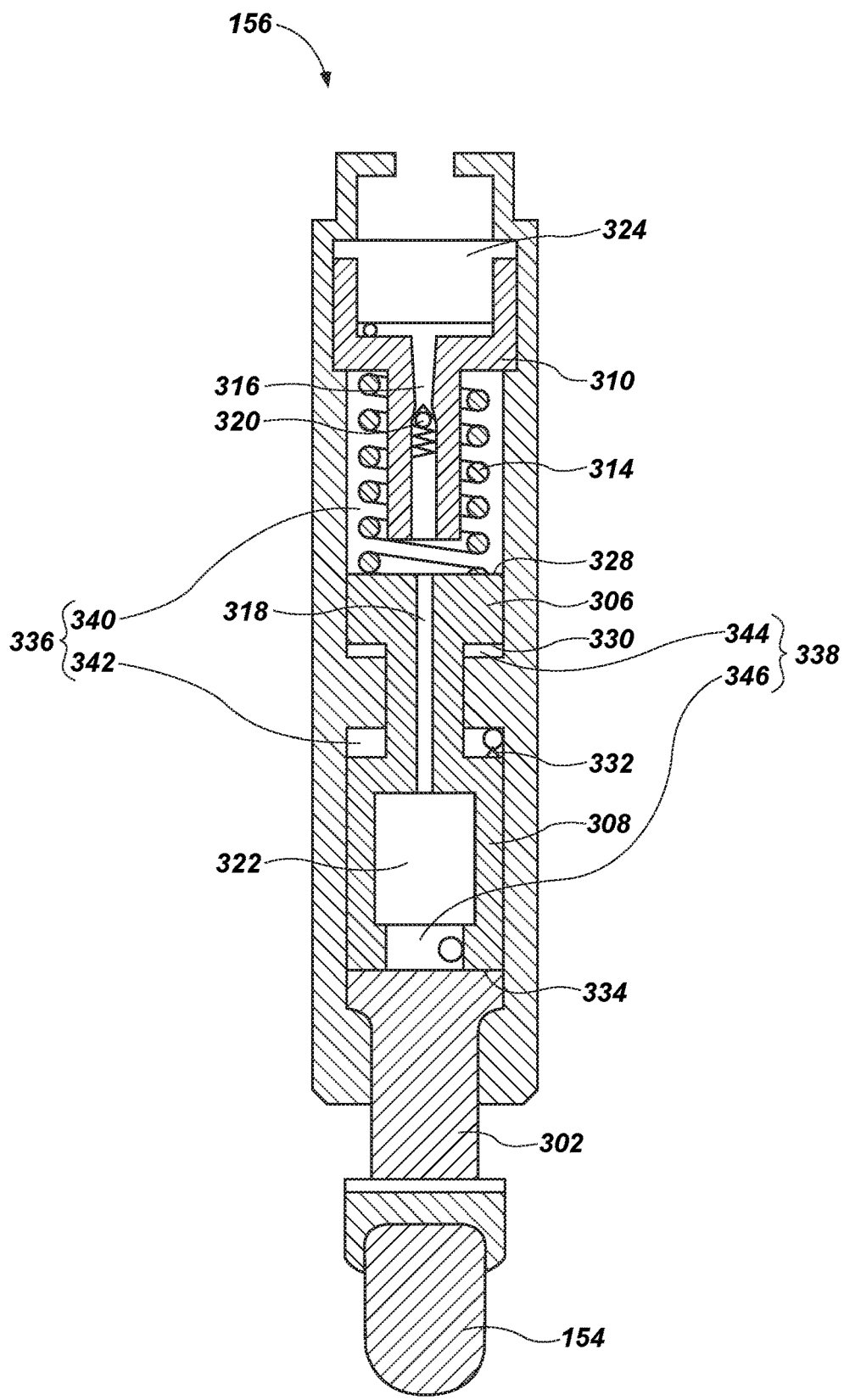
FIG. 4 is a cross-sectional view of an actuation device for a self-adjusting drill bit according to another embodiment of the present disclosure.

FIG. 3 shows a schematic view of an actuation device 156 of a self-adjusting earth-boring tool 200 (FIG. 2) according to an embodiment of the present disclosure. FIG. 4 is a cross-sectional view of an example implementation of the actuation device 156 of a self-adjusting bit of FIG. 4. Referring to FIGS. 3 and 4 together, the actuation device 156 may include a connection member 302, a chamber 304, a first reciprocating member 306, a second reciprocating member 308, a divider member 310, a hydraulic fluid 312, a biasing member 314, a first fluid flow path 316, a second fluid flow path 318, a first flow control device 320, a second flow control device 322, a pressure compensator 324, and a drilling element 154. For example, the actuation device 156 may include any of the actuation devices described in U.S. patent application Ser. No. 14/972,635 to Ricks et al., filed Dec. 17, 2015 and U.S. patent application Ser. No. 14/851,117 to Jain, filed Sep. 11, 2015, the disclosures of each of which are incorporated in their entirety by reference herein.

In particular, the first reciprocating member 306 and the second reciprocating member 308 may be attached to the connection member 302 at different locations along a longitudinal axis of the connection member 302. The drilling element 154 may be attached to a longitudinal end of the connection member 302. The first reciprocating member 306 may have a front surface 328 and an opposite back surface 330, and the second reciprocating member 308 have a front surface 332 and an opposite back surface 334. As used herein, a "front surface" of a reciprocating member may refer to a surface of the reciprocating member that, if subjected to a force, will result in the reciprocating member moving the connection member 302 outward toward a formation 118 (FIG. 1) (e.g., at least partially out of the chamber 304). For example, the front surface 328 of the first reciprocating member 306 may be a surface of the first reciprocating member 306 opposite the connection member 302. Furthermore, as used herein, a "back surface" of a reciprocating member may refer to a surface of the reciprocating member that, if subjected to a force, will result in the reciprocating member moving the connection member 302 inward and further into the chamber 304. For example, the back surface 330 of the first reciprocating member 306 may be a surface of the first reciprocating member 306 that is attached to the connection member 302.

The chamber 304 may be sealingly divided by the first and second reciprocating members 306, 308 (e.g., pistons) and the divider member 310 into a first fluid chamber 336 and a second fluid chamber 338. The first fluid chamber 336 may include a first portion 340 and a second portion 342. Furthermore, the second fluid chamber 338 may have a first portion 344 and a second portion 346. The first portion 340 of the first fluid chamber 336 may be sealingly isolated from the first portion 344 of the second fluid chamber 338 by the first reciprocating member 306.

The first portion 344 of the second fluid chamber 338 may be isolated from the second portion 342 of the first fluid chamber 336 by the divider member 310. The divider member 310 may be stationary relative to the first portion 344 of the second fluid chamber 338 and the second portion 342 of the first fluid chamber 336. The second portion 342 of the first fluid chamber 336 may be sealingly divided from the second portion 346 of the second fluid chamber 338 by the second reciprocating member 308. For example, the second portion 342 of the first fluid chamber 336 may be located on a front side of the second reciprocating member 308 (e.g., at least partially defined by the front surface 332 of the second reciprocating member 308), and the second portion 346 of the second fluid chamber 338 may be located on a back side of the second reciprocating member 308 (e.g., at least partially defined by the back surface 334 of the second reciprocating member 308).

The first fluid chamber 336 and a second fluid chamber 338 may be at least substantially filled with the hydraulic fluid 312. The hydraulic fluid 312 may include any hydraulic fluid 312 suitable for downhole use, such as oil and, more specifically a silicone oil.

In some embodiments, the first and second fluid chambers 336, 338 and may be in fluid communication with each other via the first fluid flow path 316 and the second fluid flow path 318. For example, the first fluid flow path 316 may allow hydraulic fluid 312 to flow from the second fluid chamber 338 to the first fluid chamber 336. The first fluid flow path 316 may extend from the second portion 346 of the second fluid chamber 338 to the first portion 340 of the first fluid chamber 336 and may allow the hydraulic fluid 312 to flow from the second portion 346 of the second fluid chamber 338 to the first portion 340 of the first fluid chamber 336. Furthermore, the first fluid flow path 316 may extend from the first portion 344 of the second fluid chamber 338 to the first portion 340 of the first fluid chamber 336 and may allow the hydraulic fluid 312 to flow from the first portion 344 of the second fluid chamber 338 to the first portion 340 of the first fluid chamber 336.

The first flow control device 320 may be disposed within the first fluid flow path 316 and may be configured to control the flowrate of the hydraulic fluid 312 from the second fluid chamber 338 to the first fluid chamber 336. In some embodiments, the first flow control device 320 may include one or more of a first check valve and a first restrictor (e.g., an orifice). In some embodiments, the first flow control device 320 may include only a first check valve. In other embodiments, the first flow control device 320 may include only a first restrictor. As will be discussed in greater detail below, in some embodiments, the first flow control device 320 may include a flow control device formed via additive manufacturing. As a result, a flowrate of the hydraulic fluid 312 (e.g., parameters of the flowrates through the first flow control device 320) may be selected (e.g., chosen) when forming the first flow control device 320. In other embodiments, the first flow control device 320 may include both the first check valve and the first restrictor.

The second fluid flow path 318 may allow the hydraulic fluid 312 to flow from the first fluid chamber 336 to the second fluid chamber 338. For example, the second fluid flow path 318 may extend from the first portion 340 of the first fluid chamber 336 to the second portion 346 of the second fluid chamber 338 and may allow the hydraulic fluid 312 to flow from the first portion 340 of the first fluid chamber 336 to the second portion 346 of the second fluid chamber 338. Furthermore, the second fluid flow path 318 may extend from the second portion 342 of the first fluid chamber 336 to the second portion 346 of the second fluid chamber 338 and may allow the hydraulic fluid 312 to flow from the second portion 342 of the first fluid chamber 336 to the second portion 346 of the second fluid chamber 338. The second flow control device 322 may be disposed within the second fluid flow path 318 and may be configured to control the flowrate of the hydraulic fluid 312 from the first fluid chamber 336 to the second fluid chamber 338 (i.e., from the first and second portions 340, 342 of the first fluid chamber 336 to the second portion 346 of the second fluid chamber 338). In some embodiments, the second flow control device 322 may include one or more of a second check valve and a second restrictor (e.g., orifice). In some embodiments, the second flow control device 322 may include only a second check valve. In other embodiments, the second flow control device 322 may include only a second restrictor. As will be discussed in greater detail below, in some embodiments, the second flow control device 322 may include a flow control device formed via additive manufacturing. As a result, a flowrate of the hydraulic fluid 312 (e.g., parameters of the flowrates through the second flow control device 322) may be selected (e.g., chosen) when forming the second flow control device 322. In other embodiments, the second flow control device 322 may include both the second check valve and the second restrictor.

The connection member 302 may be connected at the first longitudinal end thereof to the back surface 330 of the first reciprocating member 306, which faces the first portion 344 of the second fluid chamber 338. Furthermore, as discussed above, the connection member 302 may be connected to the drilling element 154 at a second, opposite longitudinal end of the connection member 302. The biasing member 314 (e.g., a spring) may be disposed within the first portion 340 of the first fluid chamber 336 and may be attached to the first reciprocating member 306 on the front surface 328 of the first reciprocating member 306 opposite the connection member 302 and may exert a force on the first reciprocating member 306 and may move the first reciprocating member 306, and as a result, the connection member 302 outward toward a formation 118 (FIG. 1). For example, in operation, the biasing member 314 may move the first reciprocating member 306 outward, which may in turn move the connection member 302 and the drilling element 154 outward (i.e., extend the drilling element 154). Such movement of the first reciprocating member 306, connection member 302, and drilling element 154 may be referred to herein as an "outward stroke." As the first reciprocating member 306 moves outward, the first reciprocating member 306 may expel hydraulic fluid 312 from the second fluid chamber 338, through the first fluid flow path 316 and the first flow control device 320, and into the first fluid chamber 336.

Furthermore, the second reciprocating member 308 may also be attached to the connection member 302 but may be attached to a portion of the connection member 302 axially between the first longitudinal end connected to the first reciprocating member 306 and the second longitudinal end connected to the drilling element 154. For example, the second reciprocating member 308 may have a generally annular shape and the connection member 302 may extend through the second reciprocating member 308. Additionally, the second reciprocating member 308 may be spaced by at least some distance from the first reciprocating member 306 along the longitudinal axis of the connection member 302. Furthermore, because the second reciprocating member 308 is attached to the connection member 302, which is attached to the first reciprocating member 306, when the first reciprocating member 306 moves outward due to the biasing member 314, the second reciprocating member 308 moves outward. In other words, the force applied on the first reciprocating member 306 by the biasing member 314 may result in the second reciprocating member 308 moving outward in addition to the first reciprocating member 306 moving outward. As the second reciprocating member 308 moves outward, the second reciprocating member 308 may expel hydraulic fluid 312 from the second fluid chamber 338, through the first fluid flow path 316 and the first flow control device 320, and into the first fluid chamber 336.

Conversely, when the drilling element 154 contacts the formation 118 (FIG. 1), the formation 118 (FIG. 1) may exert a force on the drilling element 154, which may move the connection member 302 and, as a result, the first and second reciprocating members 306, 308 inward. Moving the first reciprocating member 306 inward may expel the hydraulic fluid 312 from the first fluid chamber 336, through the second fluid flow path 318 and the second flow control device 322, and into the second fluid chamber 338. Furthermore, moving the second reciprocating member 308 inward may expel hydraulic fluid 312 from the first fluid chamber 336, through the second fluid flow path 318 and the second flow control device 322, and into the second fluid chamber 338. Pushing hydraulic fluid 312 from the first and second portions 340, 342 of the first fluid chamber 336 into the second fluid chamber 338 may move the drilling element 154 inward (i.e., retract the drilling element 154). Such movement of the first and second reciprocating members 306, 308 and drilling element 154 may be referred to herein as an "inward stroke."

The rate of the movement of the first and second reciprocating members 306, 308 (e.g., the speed at which the first and second reciprocating members 306, 308 move through the outward and inward strokes) may be controlled by the flowrates of the hydraulic fluid 312 through the first and second flow control devices 320, 322. As a result, the rate of the movement of the drilling element 154 (e.g., the speed at which drilling element 154 extends and retracts) and the position of the drilling element 154 relative to the surface 230 (FIG. 2) may be controlled by the flowrates of the hydraulic fluid 312 through the first and second flow control devices 320, 322.

As a non-limiting example, the first and second flow control devices 320, 322, may be selected (e.g., formed) to provide a slow outward stroke (i.e., slow flowrate of the hydraulic fluid 312 through the first fluid flow path 316) of the drilling element 154 and a fast inward stroke of the drilling element 154 (i.e., a fast flowrate of the hydraulic fluid 312 through the second fluid flow path 318). For example, the first flow control device 320 may be formed to have relatively more restriction to provide a slow outward stroke, and the second flow control device 322 may be formed to have relatively less restriction to provide a fast inward stroke. In other embodiments, the first and second flow control devices 320, 322, may be selected to provide a fast outward stroke of the drilling element 154 and a slow inward stroke of the drilling element 154. For example, the first flow control device 320 may be formed to have relatively less restriction to provide a fast outward stroke, and the second flow control device 322 may be formed to have relatively more restriction to provide a slow inward stroke.

In some embodiments, the first and second flow control devices 320, 322 may be selected (e.g., formed) to provide constant fluid flowrate exchange between the first fluid chamber 336 and the second fluid chamber 338. Constant fluid flowrates may provide a first constant rate for the extension for the connection member 302 and a second constant rate for the retraction of the connection member 302 and, thus, corresponding constant rates for extension and retraction of the drilling element 154. In some embodiments, the flowrate of the hydraulic fluid 312 through the first flow control device 320 may be set such that when the earth-boring tool 200 (FIG. 2) is not in use, i.e., there is no external force being applied onto the drilling element 154, the biasing member 314 will extend the drilling element 154 to a maximum extended position. In some embodiments, the flowrate of the hydraulic fluid 312 through the first flow control device 320 may be set so that the biasing member 314 extends the drilling element 154 relatively fast or suddenly.

In some embodiments, the flowrates of the hydraulic fluid 312 through the second flow control device 322 may be set to allow a relatively slow flowrate of the hydraulic fluid 312 from the first fluid chamber 336 into the second fluid chamber 338, thereby causing the drilling element 154 to retract relative to the surface 230 (FIG. 2) relatively slowly. For example, the extension rate of the drilling element 154 may be set so that the drilling element 154 extends from the fully retracted position to a fully extended position over a few seconds or a fraction of a second while it retracts from the fully extended position to the fully retracted position over one or several minutes or longer (such as between 2-5 minutes). It will be noted, that any suitable rate may be set for the extension and retraction of the drilling element 154. Thus, the earth-boring tool 200 (FIG. 2) may act as a self-adjusting drill bit such as the self-adjusting drill bit described in U.S. Pat. App. Pub. No. 2015/0191979 A1, to Jain et al., filed Oct. 6, 2014, now U.S. Pat. No. 9,708,859, issued Jul. 18, 2017, the disclosure of which is incorporated in its entirety herein by this reference. Furthermore, the actuation device 156 may move through outward and inward strokes in the same manners described in patent application Ser. No. 14/972,635 to Ricks et al., filed Dec. 17, 2015 and patent application Ser. No. 14/851,117 to Jain, filed Sep. 11, 2015.

In some embodiments, in order to more precisely select flowrates and to optimize the flowrates of the hydraulic fluid 312 through the first and second flow control devices 320, 322, the flow control devices 320, 322 can be formed via additive manufacturing (i.e., 3D printing). For instance, the flow control devices 320, 322 can be formed via any suitable additive manufacturing processes known in the art. As a non-limiting example, in one or more embodiments, the flow control devices 320, 322 may be formed via fused deposition modeling. In other embodiments, the flow control devices 320, 322 can be formed via one or more additive manufacturing processes, such as, for example, direct metal deposition, micro-plasma powder deposition, direct laser sintering, selective laser sintering, electron beam melting, electron beam freeform fabrication, inkjet 3D printing, and other additive manufacturing processes. For clarity and by way of example and not limitation, a description of an example method of forming a flow control device via additive manufacturing is provided below in regard to FIG. 5.

Figure 5:
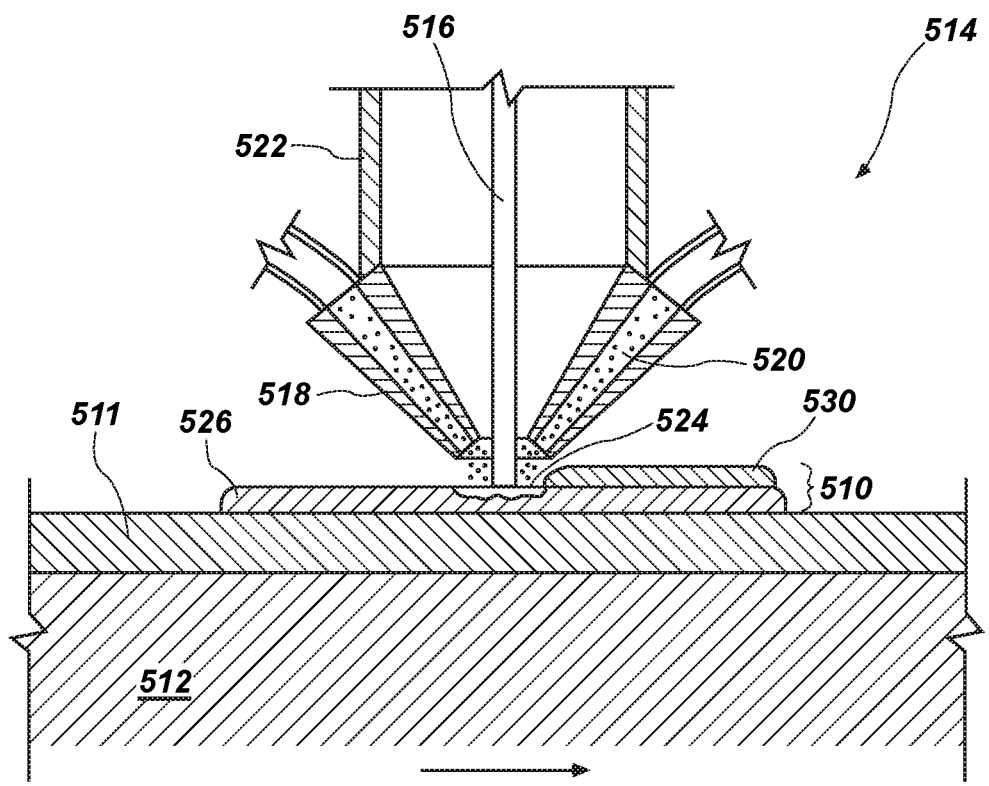
FIG. 5 is a side cross-sectional view of an additive manufacturing device utilized to form flow control devices of a self-adjusting drill bit according to one or more embodiments of the present disclosure.

FIG. 5 illustrates a simplified cross-sectional view of an embodiment of an additive manufacturing process (e.g., direct metal deposition (DMD) process) that can be used to form a flow control device. The additive manufacturing process may include a machine tool component configured to position and/or manipulate a workpiece, such as a multi-axis positioner 512. As a specific, non-limiting example, the multi-axis positioner 512 may be a component of a multi-axis, computer-numeric-control (CNC) machine tool. In other words, the multi-axis positioner 512 may be operatively (e.g., mechanically, electrically) coupled to the multi-axis machine tool. The multi-axis machine tool may include a CNC processor (not shown) programmed to read an electronic file representing a three-dimensional mode (3D) model of a flow control device (or any earth-boring tool), and to generate tool paths based at least in part on the three-dimensional model for one or more machine tools (e.g., additive manufacturing tools) operatively connected to the multi-axis positioner 512, as described below. The additive manufacturing tools may be operated along respective tool paths to form geometric features of a flow control device 510. The tool paths may include movement (e.g., linear movement in direction) of the multi-axis positioner 512, which may be controlled by the CNC processor through motors (e.g., stepper motors), linear actuators, or other electromechanical devices.

The multi-axis positioner 512 may include a substrate 511 disposed thereon. The substrate 511 may include a deposition substract or die preform as is known in the art. For example, the substrate 511 may serve as a printing surface for printing the flow control device thereon. Furthermore, the substrate 511 may be configured to be easily removable from the eventual printed flow control device.

An additive manufacturing device may be operatively coupled (e.g., mechanically and/or electrically coupled) to the multi-axis positioner 512. As non-limiting examples, the additive manufacturing tool may be or include one or more tools configured to implement direct metal deposition, micro-plasma powder deposition, selective laser melting, selective laser sintering, direct laser sintering, electron beam melting, electron beam freeform fabrication, and other additive manufacturing processes. In the embodiment shown in FIG. 5, the additive manufacturing tool is a direct metal deposition tool 514. The direct metal deposition tool 514 may include a heat source 516, and one or more deposition nozzles 518 may be positioned proximate the flow control device 510. The heat source 516 may comprise a laser, an electron beam, plasma arc, or any other suitable heat source. For example, the heat source 516 may include a $CO_2$ laser. In another embodiment, the heat source 516 may be separate and distinct from the direct metal deposition tool 514 and may be independently positionable with respect to the flow control device 510 for optimal selective heating of a portion of the surface of the flow control device 510.

The one or more deposition nozzles 518 may be configured to deliver material for deposition on the substrate 511 or on a previously formed portion of a flow control device 510 (e.g., a previously formed layer). For example, the one or more deposition nozzles 518 may be operably connected to one or more reservoirs (not shown) containing powdered metal material 520 (i.e., feedstock). In some embodiments, a fluid medium may be used to deliver the powdered metal material 520 from the one or more reservoirs through the one or more deposition nozzles 518. For example, particles of the powdered metal material 520 may be entrained within a flow of inert gas (e.g., argon) and delivered by the flow of inert gas through the one or more deposition nozzles 518. In other embodiments, metallic material may be delivered in non-powdered form, e.g., as a wire or rod of material.

The heat source 516 and the one or more deposition nozzles 518 may be affixed to a gantry 522 positioned adjacent the multi-axis positioner 512. In some embodiments, the gantry 522 may include computer-numeric-control (CNC) capability. For example, the gantry 522 may be configured to enable linear movement of the direct metal deposition tool 514 in one or more linear directions and rotational movement of the direct metal deposition tool 514 about one or more axes. In some embodiments, the gantry 522 may be affixed to electromechanical devices, e.g., stepper motors, linear actuators, etc., that are operatively connected to the CNC processor and move the gantry 522 and the direct metal deposition tool 514 along a tool path generated by the CNC processor based on the three-dimensional model of the earth-boring tool.

During operation of the direct metal deposition tool 514, the heat source 516 may initiate a melt pool 524 by heating a localized portion of an upper surface 526 of a previously printed portion of the flow control device 510 to a melting temperature of a material of the flow control device. For example, the heat source 516 may heat previously printed portions of the flow control device 510 to a temperature within a range of about 1200° C. and about 2200° C. As will be understood, the process may not include initiating a melt pool 524 while forming an initial layer of the flow control device 510. For example the process may not include initiating a melt pool 524 while forming an initial layer of the flow control device 510 on the substrate 511. The one or more deposition nozzles 518 may deliver particles of powdered metal material 520 to the melt pool 524. The particles of powdered metal material 520 may at least partially melt upon contact with the melt pool 524, or may at least partially melt when in proximity to one or both of the melt pool 524 and the heat source 516. Subsequent solidification of the melt pool 524 after the addition of the powdered metal material 520 results in build-up of an upper surface 526 of the flow control device 510. In other words, the direct metal deposition process shown in FIG. 5 results in additional material 530 being deposited on the upper surface 526 of a previously formed portion of the flow control device 510. The additional material 530 deposited on the upper surface 526 of the flow control device 510 may be characterized as a "layer" of additional material. However, as the powdered metal material 520 may be completely melted and incorporated in the melt pool 524 in some embodiments, the additional material 530 and the material of the flow control device 510 may be substantially homogeneous.

The amount of additional material 530 deposited in one pass by the direct metal deposition tool 514 may be varied by changing operational parameters of the direct metal deposition tool 514, the gantry 522, and the multi-axis positioner 512. For example, the amount of additional material 530 deposited in one pass may be adjusted by altering the flowrate of the powdered metal material 520 and/or a rate of travel of the upper surface 526 of the flow control device 510 with respect to the direct metal deposition tool 514 (e.g., one or both of a rate of travel of the multi-axis positioner 512 and a rate of travel of the gantry 522). A desired final geometry may be imparted to the flow control device 510 by applying material to the flow control device 510 by making one or more passes with the direct metal deposition tool 514 to build up various surfaces and features. Stated differently, the direct metal deposition tool 514 may be used to form one or more flow passages through the flow control device 510 by not depositing one or more layers of additional material 530 in particular portions of the flow control device 510 while depositing one or more layers in other portions of the flow control device 510. In one or more embodiments, each layer formed via the additive manufacturing process may have a thickness with a range of about 0.2 mm and about 0.8 mm.

The direct metal deposition tool 514 may include a closed-loop control system. For example, the direct metal deposition tool 514 may include sensors (not shown) that monitor operating conditions such as melt pool temperature, melt pool size, or other conditions. Data related to the operating conditions measured by the sensors may be sent to a direct metal deposition control processor (e.g., the CNC processor or a different processor), which may evaluate the data and increase or decrease the power provided to the heat source 516 to modify the temperature and/or size of the melt pool 524. In some embodiments, the closed-loop control system may include optical sensors, proximity sensors, distance sensors or other sensors to monitor the dimensions and geometry of the additional material 530 deposited by the direct metal deposition tool 514. Data from the sensors monitoring the dimensions and geometry of the additional material 530 may be sent to the CNC processor, and the CNC processor may alter the tool path of the direct metal deposition tool 514 based on the data when the dimensions and geometry of the additional material 530 deviate a predetermined amount from design specifications (e.g., the dimensions and geometry specified by the electronic representation) of the flow control device 510.

In some embodiments, the powdered metal material 520 (i.e., feedstock) may include materials that require a relatively low heat (e.g., 800° F.–1200° F.) to harden. In one or more embodiments, the feedstock may include a maraging steel. For example, the feedstock may include low-carbon high strength steels. For instance, the feedstock may include between about 15 wt. % and about 25 wt. % nickel. Furthermore, the feedstock may include one or more of cobalt, molybdenum, titanium. As a non-limiting example, the feedstock may include between about 17 wt. % and about 19 wt. % nickel, between about 8 wt. % and about 12 wt. % cobalt, between about 3 wt. % and about 5 wt. % molybdenum, and between about 0.2 wt % and about 1.6 wt. % titanium. In further embodiments, the feedstock can include the addition of chromium (e.g., a stainless feedstock).

In additional embodiments, the feedstock may include Society of Automotive Engineers (SAE) type 630 stainless steel (i.e., 17-4 stainless steel or Unified Numbering System s17400). In yet further embodiments, the feedstock may include tungsten carbide, titanium, INCONEL®, type MP1 chrome/cobalt, aluminum, platinum, or any other suitable metal material for use in additive manufacturing processes. In other embodiments, the feedstock may include a ceramic material. Upon being formed via additive manufacturing, the flow control device 510 may be hardened via one or more hardening processes known in the art.

Figure 6:
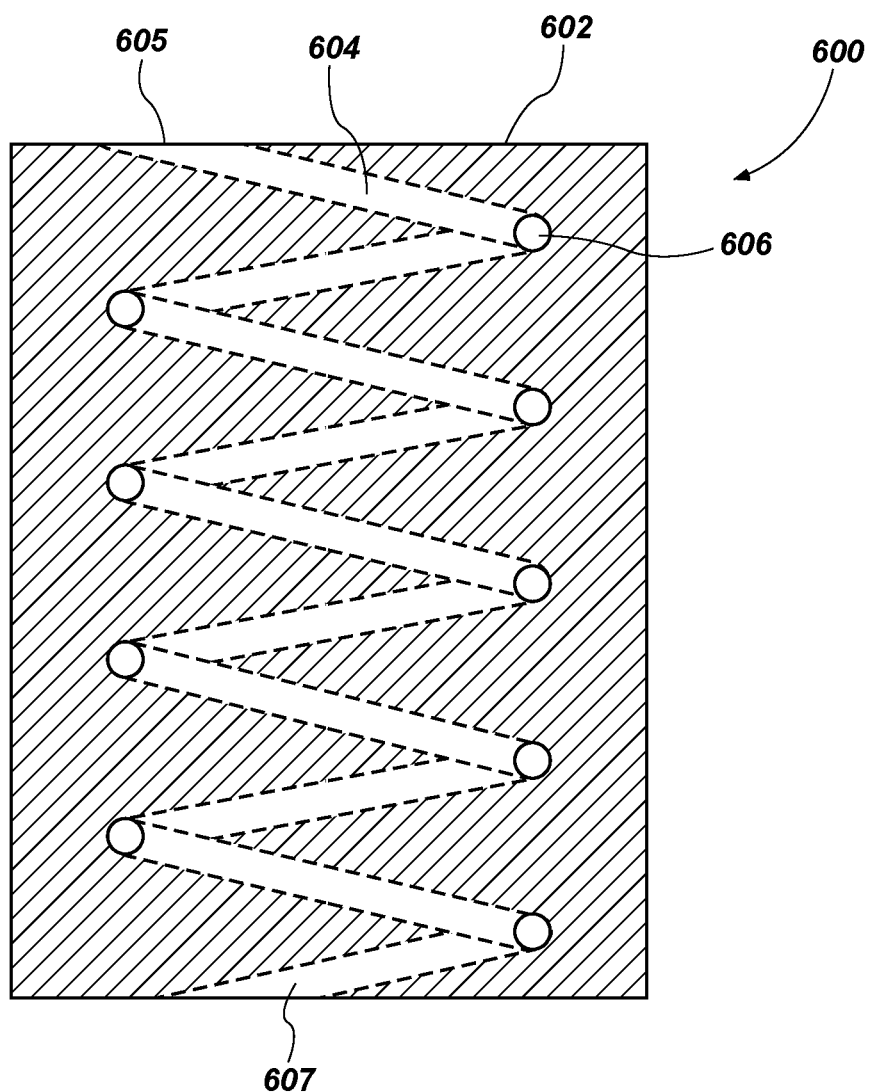
FIG. 6 is a side cross-sectional view of an additive manufacturing formed flow control device according to one or more embodiments of the present disclosure.

FIG. 6 shows a side cross-sectional view of a flow control device 600 that may be utilized as one or more of the first and second flow control devices 320, 322 (FIG. 3) according to one or more embodiments of the present disclosure. Furthermore, FIG. 6 shows a flow control device 600 that may be formed via one or more of the additive manufacturing methods described above. In some embodiments, the flow control device 600 can include a body portion 602 and at least one flow passage 604 extending through the body portion 602. The at least one flow passage 604 may include openings 605, 607 defined at opposite longitudinal ends of the flow control device 600. For example, the openings 605, 607 may be located (e.g., formed) in order to permit the hydraulic fluid 312 (FIG. 3) to pass through the flow control device 600 (e.g., from the first fluid chamber 336 to the second fluid chamber 338 (FIG. 3) or between portions thereof). For example, the flow control device 600 may include a first opening 605 at a top of the flow control device 600 and a second opening 607 at a bottom of the flow control device 600.

In some embodiments, the flow passage 604 may have a generally helical shape. For example, the flow passage 604 may form a helix. Furthermore, the flow passage 604 may be at least substantially centered relative to a longitudinal axis of the flow control device 600. In alternative embodiments, the flow passage 604 may include a plurality of connected helical shapes (i.e., helices connected via flow passages) oriented within each other concentrically, or a plurality of unconnected, concentric helices.

In one or more embodiments, the at least one flow passage 604 may include a plurality of flow passages 604. Furthermore, each flow passage 604 of the plurality of flow passages 604 may extending completely through the body portion 602 of the flow control device 600. In some embodiments, the at least one flow passage 604 may have an at least substantially constant cross-section size and shape 606 along a full length of the flow passage 604 (e.g., along a pathway of the flow passage 604 extending through the body portion 602). In other embodiments, the at least one flow passage 604 may have a varying cross-section size and/or shape 606 along the length of the at least one flow passage 604. In other words, the cross-section size and/or shape 606 of the at least one flow passage 604 may change from one portion (e.g., a first length) of the at least one flow passage 604 to another portion (e.g., a second length) of the at least one flow passage 604. In some embodiments including a plurality of flow passages 604, a cross-section size and/or shape of a first flow passage of the plurality of flow passages 604 may vary from a cross-section size and/or shape of a second flow passage of the plurality of flow passages 604. In other embodiments, each flow passage of the plurality of flow passages 604 may have at least substantially the same cross-section size and shape 606.

Because the flow control device 600 of the present disclosure is formed via additive manufacturing, the flow control device 600 may afford structural and manufacturing advantages over conventional flow control devices. For example, the flow control device 600 of the present disclosure may include more complex flow passages 604 in comparison to conventional flow control devices formed via conventional methods (e.g., etching multiple discs and annealing the discs together). In particular, the flow control device 600 of the present disclosure may enable the flow passage 604 to have more complex cross-section sizes and shapes 606, as well as different and more tortuous paths, in comparison to conventional flow control devices. For instance, due to being formed via additive manufacturing, the flow control device 600 may include flow passages 604 having cross-sectional shapes of one or more of a tear shape, a triangle shape, a rectangular shape, a star shape, a hexagram shape, an octogram shape, a hexagon shape, an octagon shape, or any other geometric shape.

By enabling the flow passages 604 of the flow control device 600 to have complex cross-section shapes 606, the flow control device 600 can include flow passages 604 having increased surface areas in comparison to conventional flow control devices formed via conventional methods. Furthermore, by having increased surface areas, the flow passages 604 of the flow control device 600 can provide more restriction (e.g., resistance) to fluid flow through the flow passages 604 of the flow control device 600 in comparison to conventional flow control devices. Accordingly, forming the flow control device 600 via additive manufacturing may allow surface areas of the flow passages 604 to be optimized in order to provide specific flowrates of hydraulic fluid 312 (FIG. 3) through the flow control device 600, and as a result, extension and retraction rates of the drilling element 154 (FIGS. 1 and 2) with respect to the drill bit 116 (FIG. 1).

Moreover, by forming the flow control device 600 via additive manufacturing, lengths of the flow passages 604 may be maximized, and in turn, and amount of restriction maximized. For example, the lengths of the flow passages 604 per a given volume of the flow control device 600 may be maximized. In other words, forming the flow control device 600 via additive manufacturing may allow more of the three-dimensional volume of the flow control device 600 to be utilized to form (i.e., define) the flow passages 604 in comparison to conventional methods of forming flow control devices. Accordingly, forming the flow control device 600 via additive manufacturing may allow lengths of the flow passages 604 to be optimized in order to provide specific flowrates of hydraulic fluid 312 (FIG. 3) through the flow control device 600, and as a result, extension and retraction rates of the drilling element 154 (FIGS. 1 and 2) with respect to the drill bit 116 (FIG. 1).

In view of the foregoing, forming the flow control device 600 via additive manufacturing may allow an overall size (e.g., volume, outside diameter, length) of the flow control device 600 to be minimized while maintaining selected surface areas and lengths of the flow passages 604. As a result, the flow control device 600 may require a reduced amount of material in comparison to conventional flow control devices. Accordingly, the flow control device 600 of the present disclosure may result in cost savings in manufacturing both the flow control device 600 and the actuation device 156 (FIG. 3).

Figure 7:
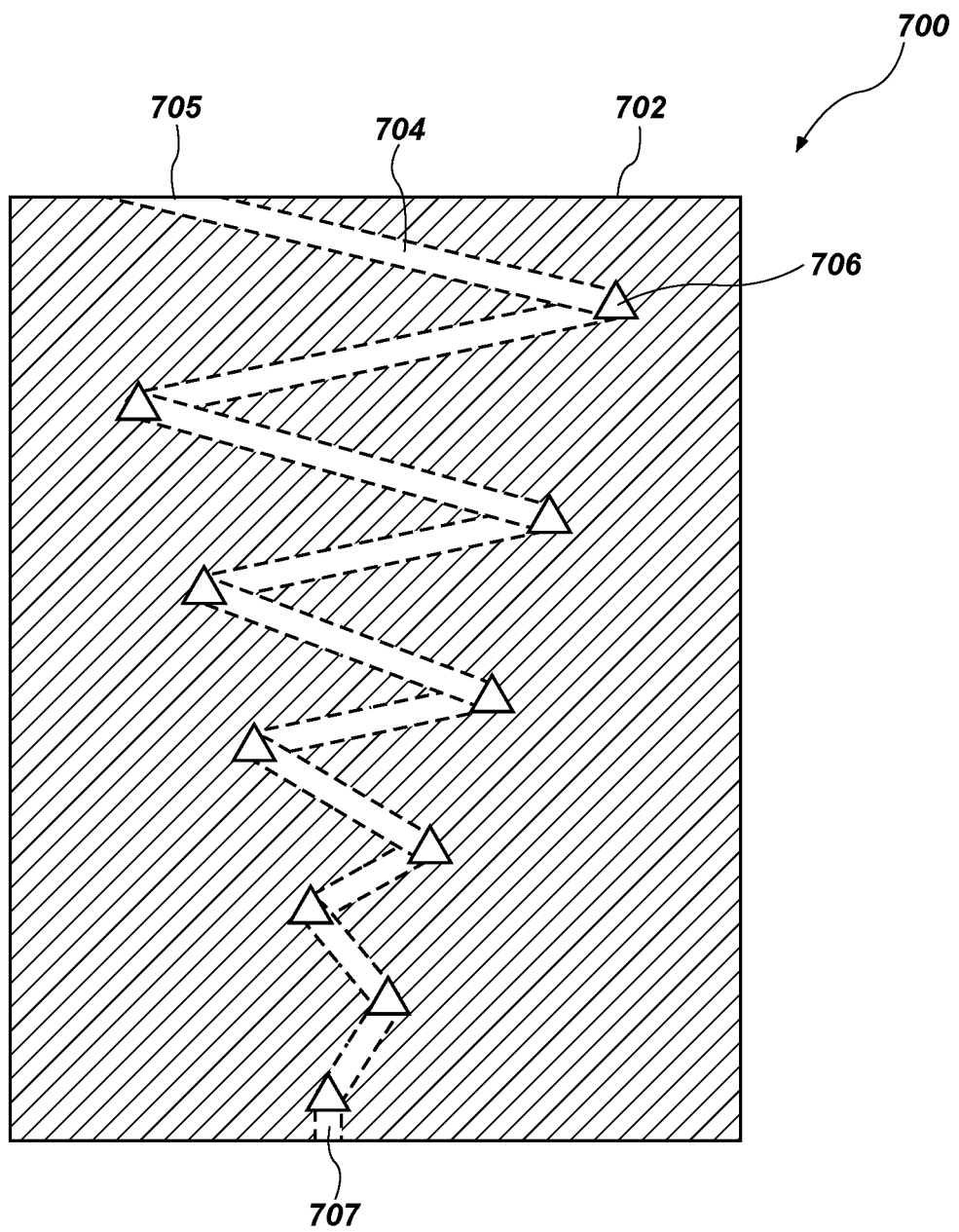
FIG. 7 is a side cross-sectional view of an additive manufacturing formed flow control device according to one or more embodiments of the present disclosure.
Figure 8:
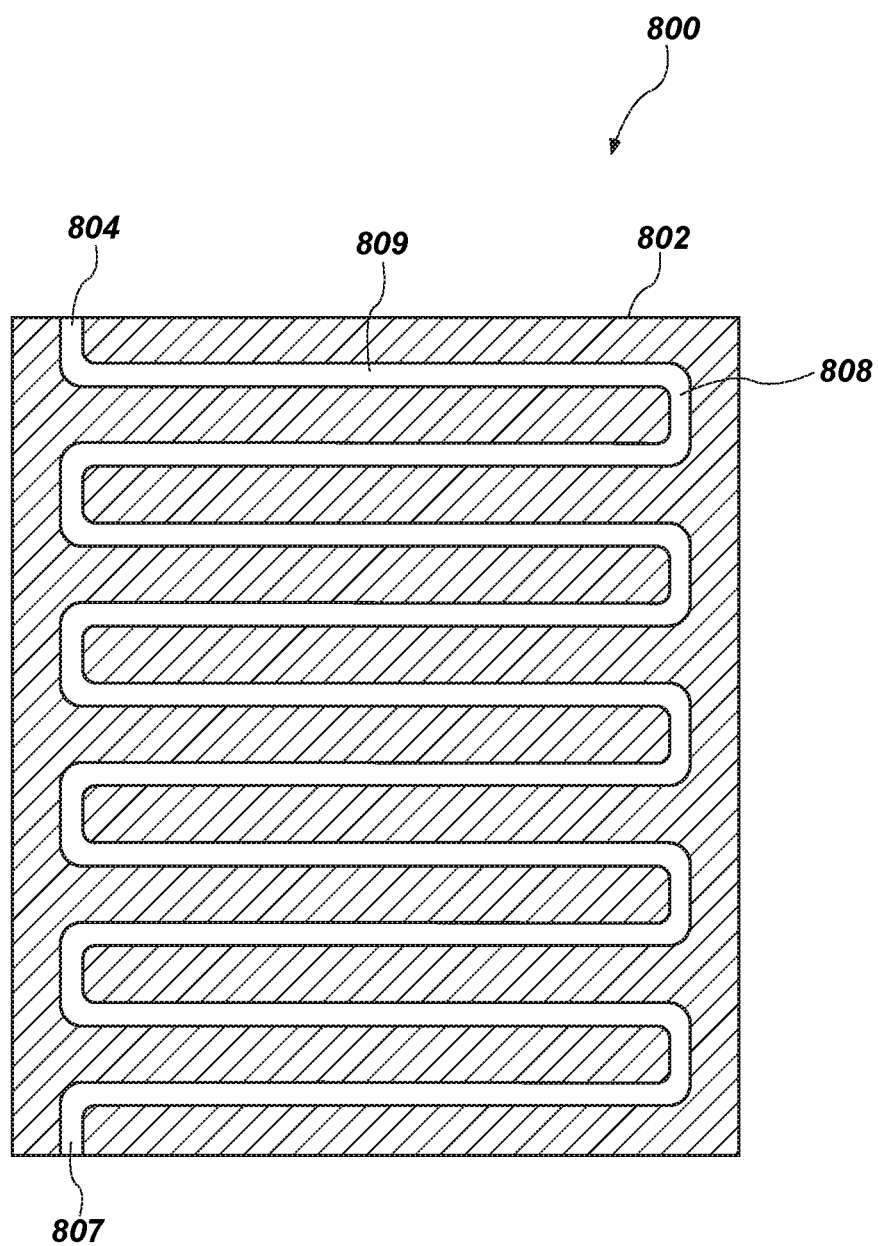
FIG. 8 is a side cross-sectional view of an additive manufacturing formed flow control device according to one or more embodiments of the present disclosure.
Figure 9:
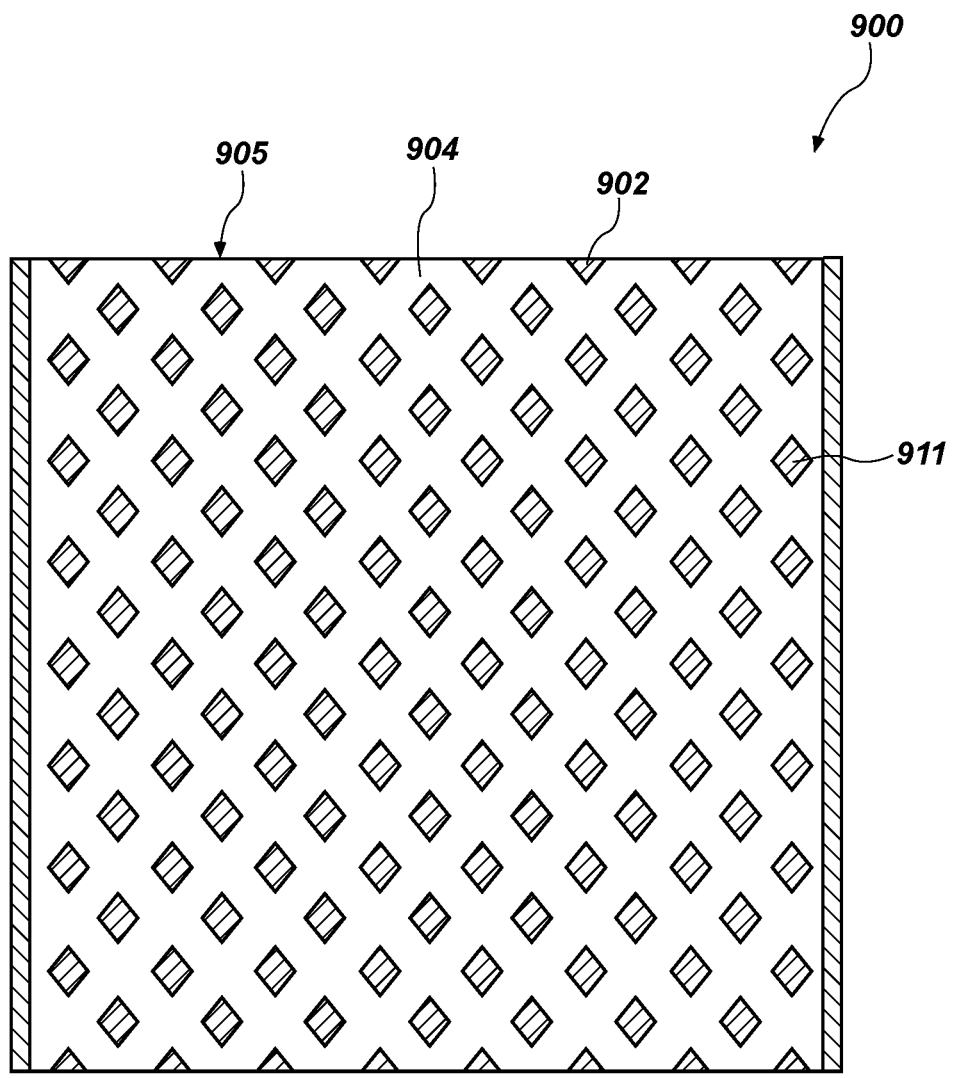
FIG. 9 is a side cross-sectional view of an additive manufacturing formed flow control device according to one or more embodiments of the present disclosure.

FIGS. 7-9 show various flow control devices having various flow passages extending through the flow control devices according to additional embodiments of the present disclosure. FIG. 7 shows a side cross-sectional view of a flow control device 700 according to another embodiment of the present disclosure. In particular, the flow control device 700 may include a flow passage 704 having a generally helical shape with a varying diameter along a longitudinal length of the helical shape. For example, in some embodiments, the flow passage 704 may have a generally helical shape with a diameter that reduces in size along the longitudinal length of the helical shape. In other words, the flow passage 704 may have a diminishing or converging helical shape. In some embodiments, the flow passage 704 may include a plurality of connected diminishing helical shapes (i.e., diminishing or converging helical shapes connected via flow passages) disposed within each other concentrically. Furthermore, as shown in FIG. 7, the flow passage 704 may include a complex cross-section shape 706 (e.g., a triangular cross-section shape), which, as is discussed above, may increase restriction of the flow control device 700.

FIG. 8 shows a side cross-sectional view of a flow control device 800 according to another embodiment of the present disclosure. In some instances, the flow control device 800 may include a flow passage 804 that includes a plurality of relatively linear sections 809 and a plurality of bends 808 (e.g., U-turns, elbows) connecting the linear section 809. For example, the flow passage 804 of a flow control device 800 may extend laterally back and forth within the flow control device 800. Furthermore, although the flow passage 804 is shown as extending within a single plane (e.g., the plane defined by FIG. 8), the disclosure is not so limited. Rather, in some embodiments, the flow passage 804 may extending in multiple planes (e.g., inward and outward from the plane defined by FIG. 8).

FIG. 9 shows a side cross-sectional view of a flow control device 900 according to another embodiment of the present disclosure. As shown in FIG. 9, in some embodiments, the flow control device 900 may include a flow passage 904 having a general lattice shape. For example, the flow passage 904 may include a plurality of crossing linear voids that define diamond- and/or square-shaped rods 911 extending laterally across a body portion 902 of the flow control device 900. Furthermore, although diamond- and/or square-shaped rods 911 are described herein, the disclosure is not so limited. For example, the rods may have any geometric cross-sectional shape, such as, a triangle, circle, hexagon, octagon, hexagram, or octogram shape.

Referring to FIGS. 4 and 5 together, some embodiments of the present disclosure include a reciprocating member (e.g., the second reciprocating member 308) and flow control device (e.g., the second flow control device 322) assembly (referred to hereinafter as "reciprocating flow control device assembly"). Furthermore, the reciprocating flow control device assembly may be formed via any of the additive manufacturing methods described above. Moreover, the reciprocating flow control device assembly may be formed via a single printing process. In other words, the reciprocating member (e.g., the second reciprocating member 308) and flow control device (e.g., the second flow control device 322) of the assembly can be formed integrally via a single printing process, rather than comprising a multi-component assembly. Forming the reciprocating flow control device assembly via a single printing process may reduce and/or remove difficulties of positioning the flow control device within the reciprocating member post forming each of the components. Moreover, forming multiple parts via a single printing process may reduce costs, reduce required parts, and enable a size reduction of the multiple parts.

Referring to FIGS. 1-9 together, although specific implementations of the additive manufactured flow control devices 320, 322 are described herein, the disclosure is not so limited. Rather, the flow control devices 320, 322 can be utilized in any downhole tool where a fluid is moved through a flow restrictor (e.g., flow control device) from a first chamber to a second chamber. As used herein, a fluid may include a liquid, a gas, or both. For example, the flow control devices 320, 322 can be utilized wherever fluid flow is used to move (e.g., retract and/or extend) movable components of a downhole tool. As an additional example, the flow control devices 320, 322 can be utilized wherever fluid flow is used to cool components of a downhole tool.

As noted above, the flow control devices 320, 322 can be utilized wherever fluid and flow is used to move (e.g., retract and/or extend) movable components of a downhole tool. For example, the one or more of the flow control devices 320, 322 may be in fluid communication with a movable component (e.g., a drilling element) of the downhole tool. Furthermore, one or more of the flow control devices 320, 322 may be configured to control a flowrate of the fluid through the one or more of the flow control devices 320, 322. Additionally, one or more of the flow control devices 320, 322 may be configured to control a movement (e.g., an extension and/or retraction) of the movable component via the flowrate of hydraulic fluid through the one or more of the flow control devices 320, 322.

In some embodiments, the flow control devices 320, 322 can be utilized within a sensor extension and retraction assembly to extend and retract sensors 140 within a drill bit 116 of the downhole tool or within the drill string 110 of the downhole tool. In particular, the flow control devices 320, 322 can be utilized to control extension and retraction rates of sensors via pulse codes in any of the manners described in U.S. Pat. No. 6,157,893 to Berger et al., filed Apr. 4, 1999, the disclosure of which is incorporated in its entirety by reference herein. In other embodiments, the flow control devices 320, 322 may be part of an actuation device (e.g., actuation device 156) and may extend and retract sensors in at least substantially the same manner as described above in regard to drilling elements.

Additionally, the flow control devices 320, 322 can be utilized within a pad (e.g., a gage pad, pad element) extension and retraction assembly. For example, the actuation device 156 may be coupled to a gage pad and may be configured to control rates at which the gage pad extends and retracts from the gage region of the bit body 202. Furthermore, as noted above, in some embodiments, the actuation device 156 may at least partially control rates at which the gage pad extends and retracts from the gage region via flowrates of a fluid through the flow control devices 320, 322. In some instances, the actuation device 156 may be disposed within a gage region similar to the actuation devices described in U.S. patent application Ser. No. 14/516,069, to Jain, the disclosure of which is incorporated in its entirety herein by this reference.

Moreover, the flow control devices 320, 322 can be utilized within a reamer blade extension and retraction assembly to extend and retract reamer blades. In particular, the flow control devices 320, 322 can be utilized to control extension and retraction rates of reamer blades in any of the manners described in U.S. Pat. No. 7,721,823 to Radford, filed Oct. 19, 2007, the disclosure of which is incorporated in its entirety by reference herein. In further embodiments, the flow control devices 320, 322 can be utilized to extend and/or retract wear elements and bearing elements. For example, the flow control devices 320, 322 can be utilized to extend and/or retract cutting elements, pads, elements making rolling contact, elements that reduce friction with formations, PDC bit blades, cones, elements for altering junk slot geometry, etc.

As mentioned briefly above, the flow control devices 320, 322 can be utilized wherever fluid flow is used in cooling assemblies to cool components of a downhole tool. For example, the flow control devices 320, 322 can be utilized to provide flow of a cooling fluid to bearings of the downhole tool. For instance, the flow control devices 320, 322 can be utilized to provide flow of a cooling fluid to bearings of rollers cones of the drill bit 116 of the downhole tool. Additionally, the flow control devices 320, 322 can be utilized to provide flow of a cooling fluid to bearings of mud motors. For example, the flow control devices 320, 322 may provide a fluid to bearings in any of the manners described in U.S. application Ser. No. 14/371,106 to Hay et al., filed Jan. 11, 2012 the disclosure of which is incorporated in its entirety by reference herein. Furthermore, the flow control devices 320, 322 can be utilized to provide flow of a cooling fluid to and/or through cutting elements of the drill bit 116. For example, the flow control devices 320, 322 may provide a fluid to cutting elements in any of the manners described in U.S. application Ser. No. 13/382,070 to Fraser, filed Jul. 2, 2010, the disclosure of which is incorporated in its entirety by reference herein.

Moreover, the flow control devices 320, 322 can be utilized to provide flow of a cooling fluid to electronic bays of the drill bit 116 and/or drill string 110. In additional embodiments, the flow control devices 320, 322 can be utilized for providing samples of mud sensor data. For instance, the flow control devices 320, 322 can be used to provide data regarding temperature, viscosity, solids contents, etc. For example, the flow control devices 320, 322 can be utilized to transmit data signals via fluid pressure pulses in any of the manners described in U.S. Pat. No. 7,430,153 to Fraser et al., filed Aug. 26, 2004, the disclosure of which is incorporated in its entirety by reference herein.

In further embodiments, the flow control devices 320, 322 can be utilized to power hydraulic strokers via fluid pressure. For example, the flow control devices 320, 322 can manage flow between a lower and upper chambers of the stroker in order to complete a circuit and provide electrical power to drilling components. For instance, the flow control devices 320, 322 can manage flow between a lower and upper chambers of the stroker in any of the manners described in U.S. Pat. No. 8,739,884 to Lake, filed Dec. 17, 2010, the disclosure of which is incorporated in its entirety by reference herein.

In one or more embodiments, the flow control devices 320, 322 can be utilized to provide damping effect and/or to act as shock absorbers in between drill string components 110. In such embodiments, a shock absorber may include a movable component (e.g., a piston) and the flow control devices 320, 322 may be in fluid communication with the movable component and may be configured to cause the piston to move back and forth. In further embodiments, the flow control devices 320, 322 can be utilized to redirect flow of fluids to alter balling characteristics of drill bit 116 components and/or drill string 110 components and/or reamers. In yet further embodiments, the flow control devices 320, 322 can be utilized to reduce pressure (e.g., bleed off excess pressure) from pressure sensitive components of the drill bit 116 and/or drill string 110. In additional embodiments, the flow control devices 320, 322 can be utilized within jarring tools, which are known in the art, and the flow control devices 320, 322 can be utilized in testing tools (e.g., obtaining fluid samples via side-wall fluid samplers or testers).

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. An earth-boring tool, comprising:
    a movable component; and
    an additive manufacturing formed flow control device in fluid communication with the movable component and configured to control a flowrate of the fluid through the additive manufacturing formed flow control device, wherein the additive manufacturing formed flow control device is configured to control a movement of the movable component via the flowrate of the fluid through the additive manufacturing formed flow control device, wherein the additive manufacturing formed flow control device comprises a body including at least one nonlinear fluid passage defined by at least partially superimposed gaps in adjacent layers of material of the body.

2. The earth-boring tool of claim 1, wherein the movable component comprises a sensor.

3. The earth-boring tool of claim 1, wherein the movable component comprises one of a cutting element, a pad element, and a reamer blade.

4. The earth-boring tool of claim 1, wherein the movable component comprises a piston of a shock absorber.

5. An earth-boring tool, comprising an additive manufacturing formed flow control device in fluid communication with one or more components of the earth-boring tool and configured to provide a cooling fluid to the one or more components of the earth-boring tool, wherein the additive manufacturing formed flow control device comprises a body including at least one nonlinear fluid passage defined by at least partially superimposed gaps in adjacent layers of material of the body.

6. The earth-boring tool of claim 5, wherein the one or more components of the earth-boring tool comprises one of a bearing of a roller cone, a bearing of a mud motor, a cutting element, and an electronic bay.

7. An earth-boring tool, comprising:
    a body;
    an actuation device disposed at least partially within the body, the actuation device comprising:
        a first fluid chamber;
        a second fluid chamber;
        at least one reciprocating member configured to reciprocate back and forth within the first fluid chamber and the second fluid chamber;
        a hydraulic fluid disposed within and at least substantially filling the first fluid chamber and the second fluid chamber;
        a first fluid flow path extending from the second fluid chamber to the first fluid chamber; and
        a first additive manufacturing formed flow control device disposed within the first fluid flow path and configured to control a flowrate of the hydraulic fluid through the first fluid flow path, wherein the first additive manufacturing formed flow control device comprises a body portion including at least one nonlinear fluid passage defined by at least partially superimposed gaps in adjacent layers of material of the body portion; and
    a drilling element removably coupled to the at least one reciprocating member of the actuation device.

8. The earth-boring tool of claim 7, wherein the actuation device further comprises:
    a second fluid flow path extending from the first fluid chamber to the second fluid chamber;
    a second additive manufacturing formed flow control device disposed within the second fluid flow path and configured to control a flowrate of the hydraulic fluid through the second fluid flow path and the second additive manufacturing formed flow control device.

9. The earth-boring tool of claim 8, wherein the second fluid flow path extends from the first fluid chamber to the second fluid chamber through the at least one reciprocating member.

10. The earth-boring tool of claim 7, the first additive manufacturing formed flow control device being formed via a direct metal deposition process.

11. The earth-boring tool of claim 7, the first additive manufacturing formed flow control device being formed via a laser sintering process.

12. The earth-boring tool of claim 7, wherein the at least one nonlinear fluid passage extends through the body portion and defines at least one opening at one longitudinal end of the body portion and at least one another opening at an opposite longitudinal end of the body portion.

13. The earth-boring tool of claim 12, wherein the at least one nonlinear fluid passage comprises a generally helical shape.

14. The earth-boring tool of claim 13, wherein the at least one nonlinear fluid passage comprises:
    a first cross-section shape through a first length of the at least one flow passage; and
    a second cross-section shape through a second length of the at least one flow passage.

15. The earth-boring tool of claim 12, wherein the at least one nonlinear fluid passage comprises a generally helical shape, wherein a diameter of the helical shape comprises a varying diameter along a longitudinal length of the body portion of the first additive manufacturing formed flow control device.

16. The earth-boring tool of claim 12, wherein the at least one nonlinear fluid passage comprises a general lattice shape.

17. The earth-boring tool of claim 16, wherein the at least one nonlinear fluid passage comprises a plurality of crossing linear voids defining a plurality of rods extending laterally across the first additive manufacturing formed flow control device.

18. The earth-boring tool of claim 12, wherein the at least one nonlinear fluid passage comprises:
    a plurality of linear sections; and
    a plurality of bends connecting the plurality of linear sections.

19. The earth-boring tool of claim 12, wherein the at least one nonlinear fluid passage comprises one or more of a plurality of connected helices, a plurality of concentric unconnected helices, and at least one converging helix.

20. The earth-boring tool of claim 19, wherein each helical flow passage of the plurality of connected helices comprises a different cross-section shape.

21. An actuation device for a self-adjusting earth-boring tool, the actuation device comprising:
    a first fluid chamber;
    a second fluid chamber;
    an additive manufacturing formed reciprocating member configured to reciprocate back and forth within the first fluid chamber and the second fluid chamber and having a first additive manufacturing formed flow control device disposed therein, wherein the first additive manufacturing formed flow control device extends between the first fluid chamber and the second fluid chamber, the first additive manufacturing formed flow control device being configured to control a flowrate of a hydraulic fluid between the first fluid chamber and the second fluid chamber, wherein the additive manufacturing formed flow control device comprises a body including at least one nonlinear fluid passage defined by at least partially superimposed gaps in adjacent layers of material of the body; and
    a drilling element coupled to the additive manufacturing formed reciprocating member.

22. The actuation device of claim 21, wherein the first additive manufacturing formed flow control device comprises a maraging steel.

23. The actuation device of claim 21, wherein the first additive manufacturing formed flow control device comprises stainless steel.

* * * * *

UNITED STATES PATENT AND TRADEMARK OFFICE
CERTIFICATE OF CORRECTION

PATENT NO. : 10,633,929 B2  
APPLICATION NO. : 15/662821  
DATED : April 28, 2020  
INVENTOR(S) : Kenneth R. Evans and Gregory L. Ricks Page 1 of 1

It is certified that error appears in the above-identified patent and that said Letters Patent is hereby corrected as shown below:

On the Title Page  
In ITEM (56)   Primary Examiner   change "Giovanna C Wight" to --Giovanna C Wright--

In the Specification  
Column 3,   Line 26,   change "bit having three-dimensional" to  
--bit have a three-dimensional--  
Column 12,   Line 22,   change "three-dimensional mode (3D)" to  
--three-dimensional (3D)--

Signed and Sealed this  
Second Day of June, 2020

Andrei Iancu  
*Director of the United States Patent and Trademark Office*